(12) United States Patent
Mizobata et al.

(10) Patent No.: US 12,104,100 B2
(45) Date of Patent: Oct. 1, 2024

(54) ADHESIVE COMPOSITION, ADHESIVE SHEET, AND ADHERED BODY

(71) Applicant: NITTO DENKO CORPORATION, Ibaraki (JP)

(72) Inventors: Kaori Mizobata, Ibaraki (JP); Kaori Akamatsu, Ibaraki (JP); Mika Takashima, Ibaraki (JP); Masayuki Okamoto, Ibaraki (JP)

(73) Assignee: NITTO DENKO CORPORATION, Ibaraki (JP)

(*) Notice: Subject to any disclaimer, the term of this patent is extended or adjusted under 35 U.S.C. 154(b) by 460 days.

(21) Appl. No.: 17/272,958

(22) PCT Filed: Aug. 30, 2019

(86) PCT No.: PCT/JP2019/034143
§ 371 (c)(1),
(2) Date: Mar. 3, 2021

(87) PCT Pub. No.: WO2020/050169
PCT Pub. Date: Mar. 12, 2020

(65) Prior Publication Data
US 2021/0277286 A1    Sep. 9, 2021

(30) Foreign Application Priority Data

Sep. 3, 2018  (JP) .................................. 2018-164545
Mar. 28, 2019  (JP) .................................. 2019-065065
Aug. 29, 2019  (JP) .................................. 2019-157325

(51) Int. Cl.
C09J 7/30       (2018.01)
C09J 7/29       (2018.01)
(Continued)

(52) U.S. Cl.
CPC .................... *C09J 7/30* (2018.01); *C09J 7/29* (2018.01); *C09J 9/00* (2013.01); *C09J 11/06* (2013.01);
(Continued)

(58) Field of Classification Search
CPC ......... C09J 7/10; C09J 7/30; C09J 7/29; C09J 9/00; C09J 11/06; C09J 133/08;
(Continued)

(56) References Cited

U.S. PATENT DOCUMENTS 6,248,883 B1 *  6/2001  Gorkovenko ......... C07C 311/48
558/44
6,620,308 B2 *  9/2003  Gilbert .................... B32B 37/12
205/702

(Continued)

FOREIGN PATENT DOCUMENTS

CN    104919018 A    9/2015
CN    108138026 A    6/2018
(Continued)

OTHER PUBLICATIONS

International Search Report issued for International Patent Application No. PCT/JP2019/034143 on Nov. 26, 2019, along with an English translation.
(Continued)

*Primary Examiner* — Scott R. Walshon
(74) *Attorney, Agent, or Firm* — Hauptman Ham, LLP

(57) ABSTRACT

An adhesive composition contains at least a polymer and an ionic liquid. The adhesive composition includes components such that when an ionic liquid-free adhesive layer is formed of a composition composed of the components of the adhesive composition that are other than the ionic liquid among components contained in the adhesive composition, the ionic liquid-free adhesive layer has a relative permittiv-
(Continued)

ity of 5 or more at a frequency of 100 Hz, after being left to stand in an environment of 22° C. and 20% RH for 3 days.

20 Claims, 7 Drawing Sheets

(51) Int. Cl.
 *C09J 9/00* (2006.01)
 *C09J 11/06* (2006.01)
 *C09J 133/08* (2006.01)
(52) U.S. Cl.
 CPC ........ *C09J 133/08* (2013.01); *C09J 2203/326* (2013.01); *C09J 2301/124* (2020.08); *C09J 2301/30* (2020.08); *C09J 2301/502* (2020.08)
(58) Field of Classification Search
 CPC ............ C09J 2203/326; C09J 2301/124; C09J 2301/30; C09J 2301/502; C09J 133/02; C09J 133/066; C09J 2301/314; C08F 220/1804; C08G 18/765; C08G 18/797
 See application file for complete search history.

(56) References Cited

U.S. PATENT DOCUMENTS

| | | |
|---|---|---|
| 2009/0035580 A1 | 2/2009 | Chino et al. |
| 2014/0255689 A1 | 9/2014 | Yasui et al. |
| 2016/0009960 A1* | 1/2016 | Yamada .................... B32B 7/12 156/324 |
| 2017/0022396 A1 | 1/2017 | Kimura et al. |
| 2017/0183551 A1 | 6/2017 | Liao et al. |
| 2017/0240782 A1 | 8/2017 | Suwa et al. |
| 2018/0265750 A1 | 9/2018 | Akamatsu et al. |
| 2018/0305593 A1* | 10/2018 | Akamatsu .................. C09J 5/00 |
| 2019/0031929 A1 | 1/2019 | Akamatsu et al. |
| 2020/0002581 A1 | 1/2020 | Akamatsu et al. |
| 2021/0102094 A1* | 4/2021 | Bieber ..................... C09J 7/383 |
| 2021/0130661 A1* | 5/2021 | McAllister ................ C09J 7/00 |

FOREIGN PATENT DOCUMENTS

| | | |
|---|---|---|
| EP | 2 602 814 A1 | 6/2013 |
| EP | 3 363 873 A1 | 8/2018 |
| EP | 3 363 875 A1 | 8/2018 |
| EP | 3 591 020 A1 | 1/2020 |
| EP | 3 363 873 B1 | 12/2021 |
| JP | 4139851 B2 | 8/2008 |
| JP | 2009-251281 A | 10/2009 |
| JP | 2010-37354 A | 2/2010 |
| JP | 2010-37355 A | 2/2010 |
| JP | 2013-221067 A | 10/2013 |
| JP | 2014-148598 A | 8/2014 |
| JP | 2015-129211 A | 7/2015 |
| JP | 2016-509094 A | 3/2016 |
| JP | 2016-50239 A | 4/2016 |
| JP | 2016-84438 A | 5/2016 |
| JP | 2017-14305 A | 1/2017 |
| JP | 6097112 B2 | 3/2017 |
| JP | 2017-95590 A | 6/2017 |
| JP | 2017-98369 A | 6/2017 |
| JP | 2018-172629 A | 11/2018 |
| WO | 2007/018239 A1 | 2/2007 |
| WO | 2009/041445 A1 | 4/2009 |
| WO | 2009/060909 A1 | 5/2009 |
| WO | 2016/104566 A1 | 6/2016 |
| WO | 2017/047548 A1 | 3/2017 |
| WO | 2017/064918 A1 | 4/2017 |
| WO | 2017/064925 A1 | 4/2017 |
| WO | 2018/155238 A1 | 8/2018 |
| WO | 2018/159784 A1 | 9/2018 |

OTHER PUBLICATIONS

Written Opinion issued for International Patent Application No. PCT/JP2019/034143 on Nov. 26, 2019.
Office Action issued on Feb. 13, 2023 for corresponding Taiwanese Patent Application No. 108131635, along with an English translation (12 pages).
Office Action issued on Feb. 25, 2022, for corresponding Chinese patent application No. 201980057389.4, along with an English translation.
Partial European Search Report issued on May 30, 2022, for corresponding European Patent Application No. 19857048.3.
The Extended European Search Report issued on Oct. 14, 2022 for corresponding European Patent Application No. 19857048.3 (22 pages).
Office Action issued on Aug. 1, 2023, for corresponding Japanese Patent Application No. 2019-157325, along with an English translation (15 pages).
Office Action issued on Oct. 17, 2023 for corresponding Korean Patent Application No. 10-2021-7006251, along with an English machine translation (10 pages).
Office Action issued on Mar. 5, 2024 for corresponding Japanese Patent Application No. 2019-157325, along with an English machine translation (14 pages).
Handbook of Pressure Sensitive Adhesive Technology, Donatas Satas, The Nikkan Kogyo Shimbun, Ltd., pp. 436-441, Mar. 31, 1997, along with an English translation (10 pages), cited in NPL No. 1.
Office Action issued on Jan. 23, 2024 for corresponding Taiwanese Patent Application No. 112135085, along with an English translation (11 pages).
Office Action issued on May 23, 2024 for corresponding Korean Patent Application No. 10-2021-7006251, along with an English machine translation (13 pages).

* cited by examiner

ADHESIVE COMPOSITION, ADHESIVE SHEET, AND ADHERED BODY

CROSS REFERENCE TO RELATED APPLICATION

This present application is a national stage filing under 35 U.S.C § 371 of PCT application number PCT/JP2019/034143 filed on Aug. 30, 2019, which designates the United States and was published in Japan, and which claims priority to Japanese Patent Application Nos.: 1) 2018-164545 filed on Sep. 3, 2018; 2) 2019-065065 filed on Mar. 28, 2019; and 3) 2019-157325 filed on Aug. 29, 2019 in the Japanese Patent Office. The disclosures of the above-listed applications are hereby incorporated by reference herein in their entireties.

TECHNICAL FIELD

The present invention relates to an adhesive composition, an adhesive sheet including an adhesive layer formed of the adhesive composition, and an adhered body of the adhesive sheet and an adherend.

BACKGROUND ART

In a process for producing an electronic component and the like, demand in regard to rework for improving yield and in regard to recycle of disassembling and recovering components after use has been increased. To meet the demand, a double-sided adhesive sheet having certain adhesive force and also having certain debondability is sometimes utilized in allowing members to adhere to each other in the process of producing an electronic component and the like.

As the double-sided adhesive sheet for realizing the above-described adhesive force and debondability, adhesive sheets (electrically debondable adhesive sheets) that uses an ionic liquid containing a cation and an anion in a component constituting an adhesive composition and that can be debonded by applying a voltage to an adhesive layer are known (Patent Literatures 1 to 3).

In the electrically debondable adhesive sheets of Patent Literatures 1 to 3, it is considered that when a voltage is applied, the cation of the ionic liquid moves and reduction occurs in a cathode side, the anion of the ionic liquid moves and oxidation occurs in an anode side, adhesive force at an adhesive interface is weakened, and as a result, the adhesive sheet is easy to be debonded.

CITATION LIST

Patent Literature

Patent Literature 1: JP 2010-037354 A
Patent Literature 2: Japanese Patent No. 6097112
Patent Literature 3: Japanese Patent No. 4139851

SUMMARY OF INVENTION

Technical Problem

Preferably, the electrically debondable adhesive sheet firmly adheres the members when no voltage is applied and is debonded with small force when a voltage is applied. Thus, it is preferable that a rate of decrease in adhesive force by voltage application is large in the electrically debondable adhesive sheet. However, there has been a problem that the rate of decrease in adhesive force by voltage application is small in a low humidity environment such as winter.

The present invention has been made in view of the above, and an object of the present invention is to provide an adhesive composition whose adhesive force is sufficiently decreased by applying a voltage even in a low humidity environment, and an adhesive sheet including an adhesive layer formed of the adhesive composition.

Solution to Problem

According to the study of the present inventors, the rate of decrease in adhesive force by the voltage application in the low humidity environment is due to a decrease in water content of the adhesive layer in the low humidity environment to make it difficult for the cation and the anion of the ionic liquid to move.

As a result of further studies of the present inventors, the following findings have been obtained.

First, it has been found that a relative permittivity of components other than the ionic liquid in the adhesive layer has a correlation with the rate of decrease in adhesive force by the voltage application, and the increase in the relative permittivity can increase the rate of decrease in adhesive force by the voltage application. In addition, even when the adhesive layer is placed in a low humidity environment and the water content is decreased, if the relative dielectric constant is large, the electrical debondability is good, that is, the rate of decrease in adhesive force by the voltage application is large.

Second, it has been found that an ionic conductivity of the adhesive layer and a capacitance per unit area of an interface between the adhesive layer and an adherend have a correlation with the rate of decrease in adhesive force by the voltage application, and the increase in the ionic conductivity and the capacitance per unit area of the interface between the adhesive layer and the adherend can increase the rate of decrease in adhesive force by the voltage application. In addition, even when the adhesive layer is placed in a low humidity environment and the water content is decreased, if the ionic conductivity and the capacitance per unit area of the interface between the adhesive layer and the adherend are large, the electrical debondability is good, that is, the rate of decrease in adhesive force by the voltage application is large.

One of the adhesive composition according to the present invention achieved based on the above finding above contains a polymer and an ionic liquid, and when an adhesive layer is formed of a composition composed of components other than the ionic liquid among components contained in the adhesive composition, the adhesive layer has a relative permittivity of 5 or more at a frequency of 100 Hz after being left to stand in an environment of 22° C. and 20% RH for 3 days.

Another adhesive composition according to the present invention achieved based on the second finding above contains a polymer and an ionic liquid, and when an adhesive layer is formed of the adhesive composition, the adhesive layer has a capacitance per unit area of an interface between the adhesive layer and the aluminum plate of 0.9 µF/cm² or more, and has an ionic conductivity of 10 µS/m or more after being adhered to an aluminum plate made of A5052P H32 in JIS H4000:2014 and left to stand in an environment of 22° C. and 15% RH for 7 days.

In one embodiment of the adhesive composition according to the present invention, when the adhesive layer is formed of the adhesive composition, the adhesive layer may have a capacitance per unit area of the interface between the adhesive layer and the aluminum plate of 1.2 $\mu F/cm^2$ or more, and an ionic conductivity of 20 $\mu S/m$ or more after being adhered to the aluminum plate made of A5052P H32 in JIS H4000:2014 and left to stand in the environment of 22° C. and 15% RH for 7 days.

In one embodiment of the adhesive composition according to the present invention, the adhesive composition may further contain an ionic solid.

In one embodiment of the adhesive composition according to the present invention, the polymer may include an ionic polymer.

In one embodiment of the adhesive composition according to the present invention, the polymer may include at least one selected from the group consisting of a polyester-based polymer, a urethane-based polymer, and an acrylic polymer having a carboxyl group, an alkoxy group, a hydroxy group and/or an amide bond.

Another adhesive composition according to the present invention contains a polymer and an ionic liquid, and the adhesive composition contains 0.5 to 30 parts by mass of the ionic liquid and 0.5 to 10 parts by mass of an ionic solid per 100 parts by mass of the polymer.

Another adhesive composition according to the present invention contains a polymer and an ionic liquid, and the adhesive composition contains 0.5 to 30 parts by mass of the ionic liquid per 100 parts by mass of the polymer, and the polymer contains 0.05 to 2 parts by mass of an ionic polymer.

9. Another adhesive composition according to the present invention contains 100 parts by mass of an acrylic polymer and 0.5 to 30 parts by mass of an ionic liquid, in which a proportion of a polar group-containing monomer to total monomer components constituting the acrylic polymer is 0.1 to 35% by mass.

In one embodiment of the present invention, an adhesive composition is for use in electrical debonding.

An adhesive sheet according to the present invention includes an adhesive layer formed of the adhesive composition according to the present invention.

An adhered body according to the present invention includes an adherend having a metal adherend surface and the adhesive sheet according to claim 11, and the adhesive layer of the adhesive sheet is adhered to the metal adherend surface.

Advantageous Effects of Invention

The adhesive force of the adhesive composition according to the present invention is sufficiently decreased by applying a voltage even in a low humidity environment.

DESCRIPTION OF EMBODIMENTS

Figure 1:
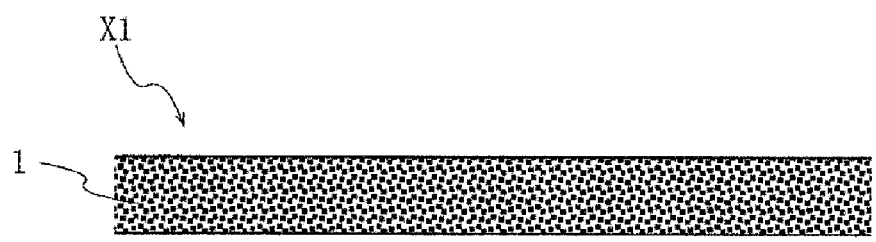
FIG. 1 is a sectional view illustrating an example of an adhesive sheet according to the present invention.

Hereinafter, the embodiments for working the present invention are described in detail. The present invention is not limited to the embodiment to be described below.

[Adhesive Composition]

Both adhesive compositions according to first and second embodiments of the present invention contain a polymer and an ionic liquid.

When an adhesive layer is formed of a composition composed of components other than the ionic liquid among components contained in the adhesive composition according to the first embodiment, the adhesive layer has a relative permittivity of 5 or more at a frequency of 100 Hz after being left to stand in an environment of 22° C. and 20% RH for 3 days.

In addition, when an adhesive layer is formed of the adhesive composition according to the second embodiment, the adhesive layer has a capacitance per unit area of an interface between the adhesive layer and the aluminum plate of 0.9 $\mu F/cm^2$ or more, and an ionic conductivity of 10 $\mu S/m$ or more after being adhered to an aluminum plate made of A5052P H32 in JIS H4000:2014 and left to stand in an environment of 22° C. and 15% RH for 7 days.

These adhesive compositions have a property that the adhesive force is decreased due to voltage application, and thus are suitable as an electrically debondable adhesive composition.

The first and second embodiments described above are not exclusive, some adhesive compositions fall under both of the first and second embodiments, and some adhesive compositions only fall under one of the first and second embodiments. Any adhesive composition corresponding to either the first or second embodiment exhibits the effects of the present invention.

Hereinafter, these adhesive compositions will be described.

In the present description, the first and second embodiments of the present invention may be collectively referred to as "the present embodiment".

In the present description, the adhesive force when no voltage is applied may be referred to as "initial adhesive force".

Among the components contained in the adhesive composition, a composition composed of components other than the ionic liquid may be referred to as an "ionic liquid-free adhesive composition".

The adhesive layer formed of the ionic liquid-free adhesive composition may be referred to as an "ionic liquid-free adhesive layer".

The property that the adhesive force is decreased due to voltage application may be referred to as "electrical debondability", and a large rate of decrease in adhesive force by voltage application may be referred to as "excellent in electrical debondability".

<Components of Adhesive Composition>
(Polymer)

The adhesive composition of the present embodiment contains a polymer. In the present embodiment, the polymer is not limited as long as the polymer is a general organic polymer compound, and examples thereof include a polymerized product or a partially polymerized product of monomers. The monomers may be one kind of monomers and may be a monomer mixture of two or more kinds of monomers. The partially polymerized product means a polymerized product in which the monomer or at least a part of the monomer mixture is partially polymerized.

The polymer in the present embodiment is not limited as long as the polymer is used as a general adhesive and has adhesiveness, and examples thereof include an acrylic polymer, a rubber-based polymer, a vinyl alkyl ether-based polymer, a silicone-based polymer, a polyester-based polymer, a polyamide-based polymer, a urethane-based polymer, a fluorine-based polymer, and an epoxy-based polymer. The polymer can be used alone or a combination of two or more kinds thereof may be used.

For increasing the relative permittivity of components other than the ionic liquid in the obtainable adhesive layer, increasing the ionic conductivity of the obtainable adhesive layer and the capacitance per unit area of the adhesive interface and improving the electrical debondability, the polymer preferably has a high relative permittivity. From this viewpoint, the polymer in the present embodiment preferably includes at least one selected from the group consisting of a polyester-based polymer, a urethane-based polymer, and an acrylic polymer having a carboxyl group, an alkoxy group, a hydroxy group and/or an amide bond. The polyester-based polymer and the urethane-based polymer have a hydroxy group that is easily polarized at the ends, and in the acrylic polymer having a carboxyl group, an alkoxy group, a hydroxy group and/or an amide bond, the carboxyl group, the alkoxy group, the hydroxy group and/or the amide bond are easily polarized. Thus, the use of these polymers allows for obtaining a polymer having a relatively large relative permittivity. The total content of the polyester-based polymer and the acrylic polymer having a carboxyl group, an alkoxy group, a hydroxy group and/or an amide bond in the polymer of the present embodiment is preferably 60% by mass or more, and more preferably 80% by mass or more.

In particular, in order to reduce the cost and increase productivity, and initial adhesive force, the polymer in the present embodiment is preferably an acrylic polymer.

That is, the adhesive composition of the present embodiment is preferably an acrylic adhesive composition containing an acrylic polymer as a polymer.

The acrylic polymer preferably has a monomer unit derived from an alkyl (meth)acrylate (the following Formula (1)) having an alkyl group having 1 to 14 carbon atoms. Such a monomer unit is suitable for obtaining large initial adhesive force. Further, for increasing the relative permittivity of components other than the ionic liquid in the adhesive layer to be obtained, increasing the ionic conductivity of the adhesive layer to be obtained and the capacitance per unit area of the adhesive interface and to improving the electrical debondability, the alkyl group $R^b$ in the following Formula (1) preferably has a small amount of carbon atoms, particularly preferably 8 or less carbon atoms, and more preferably 4 or less carbon atoms.

$$CH_2=C(R^a)COOR^b \quad (1)$$

[In the Formula (1), $R^a$ is a hydrogen atom or a methyl group, and $R^b$ is an alkyl group having 1 to 14 carbon atoms].

Examples of the alkyl (meth)acrylate having an alkyl group having 1 to 14 carbon atoms include methyl (meth)acrylate, ethyl (meth)acrylate, propyl (meth)acrylate, isopropyl (meth)acrylate, n-butyl (meth)acrylate, sec-butyl (meth)acrylate, 1,3-dimethylbutyl acrylate, pentyl (meth)acrylate, isopentyl (meth)acrylate, hexyl (meth)acrylate, 2-ethyl butyl (meth)acrylate, heptyl (meth)acrylate, n-octyl (meth)acrylate, isooctyl (meth)acrylate, 2-ethylhexyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, and n-tetradecyl (meth)acrylate. Among these, n-butyl acrylate, 2-ethylhexyl acrylate, and isononyl acrylate are preferred. The alkyl (meth)acrylate having an alkyl group having 1 to 14 carbon atoms can be used alone or a combination of two or more kinds thereof may be used.

The proportion of the alkyl (meth)acrylate having an alkyl group having 1 to 14 carbon atoms to total monomer components (100% by mass) constituting the acrylic polymer is not limited, but is preferably 70% by mass or more, more preferably 80% by mass or more, and still more preferably 85% by mass or more. 70% by mass or more of the proportion of the acrylic polymer easily allows initial adhesive force to be large.

In addition to the monomer unit derived from the alkyl (meth)acrylate having an alkyl group having 1 to 14 carbon atoms, the acrylic polymer preferably further has a monomer unit derived from a polar group-containing monomer copolymerizable with the monomer unit derived from the alkyl (meth)acrylate having an alkyl group having 1 to 14 carbon atoms, for the purpose of the modification of cohesive force, heat resistance, crosslinking property, and the like. Such a monomer unit is preferable for allowing initial adhesive force to be large because the monomer can impart a crosslinking point. Further, also from the viewpoints of increasing the relative permittivity of components other than the ionic liquid in the adhesive layer to be obtained, increasing the ionic conductivity of the adhesive layer to be obtained and the capacitance per unit area of the adhesive interface, and improving the electrical debondability, the acrylic polymer preferably includes a monomer unit derived from a polar group-containing monomer.

Examples of the polar group-containing monomer include a carboxyl group-containing monomer, an alkoxy group-containing monomer, a hydroxy group-containing monomer, a cyano group-containing monomer, a vinyl group-containing monomer, an aromatic vinyl monomer, an amide group-containing monomer, an imide group-containing monomer, an amino group-containing monomer, an epoxy group-containing monomer, a vinyl ether monomer, an N-acryloyl morpholine, a sulfo group-containing monomer, a phosphate group-containing monomer, and an acid anhydride group-containing monomer. Among these, from the viewpoint of excellent cohesiveness, a carboxyl group-containing monomer, an alkoxy group-containing monomer, a hydroxy group-containing monomer, and an amide group-containing monomer are preferred, and a carboxyl group-containing monomer is particularly preferred. A carboxyl group-containing monomer is particularly preferable for allowing initial adhesive force to be large. The polar group-containing monomer can be used alone or a combination of two or more kinds thereof may be used.

Examples of the carboxyl group-containing monomer include acrylic acid, methacrylic acid, carboxyethyl (meth)acrylate, carboxypentyl (meth)acrylate, itaconic acid, maleic acid, fumaric acid, crotonic acid, and isocrotonic acid. Acrylic acid is particularly preferred. The carboxyl group-containing monomer can be used alone or a combination of two or more kinds thereof may be used.

Examples of the alkoxy group-containing monomer include a methoxy group-containing monomer and an ethoxy group-containing monomer. Examples of the methoxy group-containing monomer include 2-methoxyethyl acrylate.

Examples of the hydroxy group-containing monomer include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)methyl (meth)acrylate, N-methylol (meth)acrylamide, vinyl alcohol, allyl alcohol, 2-hydroxyethyl vinyl ether, 4-hydroxybutyl vinyl ether, and diethylene glycol monovinyl ether. 2-hydroxyethyl (meth)acrylate and 4-hydroxybutyl (meth)acrylate are particularly preferred. The hydroxy group-containing monomer can be used alone or a combination of two or more kinds thereof may be used.

Examples of the amide group-containing monomer include acrylamide, methacrylamide, N-vinyl pyrrolidone, N,N-dimethylacrylamide, N,N-dimethyl methacrylamide, N,N-diethylacrylamide, N,N-diethyl methacrylamide, N,N'-methylenebisacrylamide, N,N-dimethylaminopropyl acrylamide, N,N-dimethylaminopropyl methacrylamide, and diacetone acrylamide. The amide group-containing monomer can be used alone or a combination of two or more kinds thereof may be used.

Examples of the cyano group-containing monomer include acrylonitrile and methacrylonitrile.

Examples of the vinyl group-containing monomer include vinyl esters such as vinyl acetate, vinyl propionate, and vinyl laurate. Vinyl acetate is particularly preferred.

Examples of the aromatic vinyl monomer include styrene, chlorostyrene, chloromethylstyrene, α-methylstyrene, and other substituted styrene.

Examples of the imide group-containing monomer include cyclohexyl maleimide, isopropyl maleimide, N-cyclohexyl maleimide, and itaconimide.

Examples of the amino group-containing monomer include aminoethyl (meth)acrylate, N,N-dimethylaminoethyl (meth)acrylate, and N,N-dimethylaminopropyl (meth)acrylate.

Examples of the epoxy group-containing monomer include glycidyl (meth)acrylate, methylglycidyl (meth)acrylate, and allyl glycidyl ether.

Examples of the vinyl ether monomer include methyl vinyl ether, ethyl vinyl ether, and isobutyl vinyl ether.

The proportion of the polar group-containing monomer to total monomer components (100% by mass) constituting the acrylic polymer is preferably 0.1% by mass or more and 35% by mass or less. The upper limit of the proportion of the polar group-containing monomer is more preferably 25% by mass, and still more preferably 20% by mass. The lower limit of the proportion is more preferably 0.5% by mass, still more preferably 1% by mass, and particularly preferably 2% by mass. When the proportion of the polar group-containing monomer is 0.1% by mass or more, cohesive force is easy to be obtained. Thus, adhesive residue is less likely to occur on the surface of an adherend after debonding the adhesive layer, and the electrical debondability is improved. In addition, when the proportion of the polar group-containing monomer is 35% by mass or less, the adhesive layer is easy to be prevented from excessively adhering to the adherend and becoming a heavy debonding type. In particular, when the proportion is 2% by mass or more and 20% by mass or less, both debondability to the adherend and adhesion between the surface of the adhesive layer and another layer are easy to be achieved.

The monomer components constituting the acrylic polymer may contain a polyfunctional monomer, for introducing a crosslinked structure into the acrylic polymer and allowing for easily obtaining necessary cohesive force.

Examples of the polyfunctional monomer include ethylene glycol di(meth)acrylate, diethylene glycol di(meth)acrylate, tetraethylene glycol di(meth)acrylate, neopentyl glycol di(meth)acrylate, 1,6-hexanediol di(meth)acrylate, trimethylolpropane tri(meth)acrylate, pentaerythritol tri(meth)acrylate, dipentaerythritol hexa(meth)acrylate, divinylbenzene, and N,N'-methylene bisacrylamide. The polyfunctional monomer can be used alone or a combination of two or more kinds thereof may be used.

The content of the polyfunctional monomer to total monomer components (100% by mass) constituting the acrylic polymer is preferably 0.1% by mass or more and 15% by mass or less. The upper limit of the content of the polyfunctional monomer is more preferably 10% by mass, and the lower limit thereof is more preferably 3% by mass. 0.1% by mass or more of the content of the polyfunctional monomer is preferable as flexibility and adhesiveness of the adhesive layer are easy to be improved. When the content of the polyfunctional monomer is 15% by mass or less, the cohesive force is not excessively high, and appropriate adhesiveness is easy to be obtained.

The polyester-based polymer is typically a polymer having a structure in which a polycarboxylic acid such as a dicarboxylic acid or a derivative thereof (hereinafter also referred to as "polycarboxylic acid monomer") is condensed with a polyhydric alcohol such as a diol or a derivative thereof (hereinafter also referred to as "polyhydric alcohol monomer").

The polycarboxylic acid monomer is not limited, but examples thereof include adipic acid, azelaic acid, dimer acid, sebacic acid, 1,4-cyclohexanedicarboxylic acid, 1,3-cyclohexanedicarboxylic acid, 1,2-cyclohexanedicarboxylic acid, 4-methyl-1,2-cyclohexanedicarboxylic acid, dodecenyl succinic anhydride, fumaric acid, succinic acid, dodecanedioic acid, hexahydrophthalic anhydride, tetrahydrophthalic anhydride, maleic acid, maleic anhydride, itaconic acid, citraconic acid, and a derivative thereof.

The polycarboxylic acid monomer can be used alone or a combination of two or more kinds thereof may be used.

The polyhydric alcohol monomer is not limited, but examples thereof include ethylene glycol, 1,2-propylene glycol, 1,3-propanediol, 2-methyl-1,3-propanediol, 1,2-butanediol, 1,3-butanediol, 1,4-butanediol, 1,5-pentanediol, 1,6-hexanediol, 3-methyl-1,5-pentanediol, neopentyl glycol, diethylene glycol, dipropylene glycol, 2,2,4-trimethyl-1,5-pentanediol, 2-ethyl-2-butylpropanediol, 1,9-nonanediol, 2-methyloctanediol, 1,10-decanediol, a derivative thereof.

The polyhydric alcohol monomer can be used alone or a combination of two or more kinds thereof may be used.

Moreover, the polymer in the present embodiment may contain an ionic polymer. The ionic polymer is a polymer having an ionic functional group. When the polymer contains an ionic polymer, the relative permittivity of the polymer is increased and the electrical debondability is improved. When the polymer contains an ionic polymer, the content of the ionic polymer is preferably 0.05 parts by mass or more and 2 parts by mass or less, per 100 parts by mass of the polymer.

The polymer in the present embodiment can be obtained by (co)polymerizing the monomer components. The polymerization method is not limited, but examples thereof include solution polymerization, emulsion polymerization, bulk polymerization, suspension polymerization, and photopolymerization (active energy ray polymerization). The solution polymerization is preferred from the viewpoint of costs and productivity. When the monomer components have been copolymerized, the resulting copolymer may be any of a random copolymer, a block copolymer, an alternating copolymer, a graft copolymer and the like.

The solution polymerization is not limited, but examples thereof include a method in which monomer components, a polymerization initiator, and the like are dissolved in a solvent, and the resultant one is heated and polymerized to obtain a polymer solution containing a polymer.

As the solvent used in the solution polymerization, various common solvents can be used. Examples of such solvents (polymerization solvents) include organic solvents, for example, aromatic hydrocarbons such as toluene, benzene, and xylene; esters such as ethyl acetate and n-butyl acetate; aliphatic hydrocarbons such as n-hexane and n-heptane; alicyclic hydrocarbons such as cyclohexane and methyl cyclohexane; and ketones such as methyl ethyl ketone and methyl isobutyl ketone. The solvent can be used alone or a combination of two or more kinds thereof may be used.

The amount of the solvent to be used is not limited, but is preferably 10 parts by mass or more and 1000 parts by mass or less to total monomer components (100 parts by mass) constituting the polymer. The upper limit of the amount of the solvent to be used is more preferably 500 parts by mass and the lower limit thereof is more preferably 50 parts by mass.

The polymerization initiator to be used in the solution polymerization is not limited, but examples thereof include a peroxide-based polymerization initiator and an azo-based polymerization initiator. The peroxide-based polymerization initiator is not limited, but examples thereof include a peroxycarbonate, a ketone peroxide, a peroxy ketal, a hydroperoxide, a dialkyl peroxide, a diacyl peroxide, and a peroxy ester, and more specific examples thereof include benzoyl peroxide, t-butyl hydroperoxide, di-t-butyl peroxide, t-butyl peroxybenzoate, dicumyl peroxide, 1,1-bis(t-butylperoxy)-3,3,5-trimethylcyclohexane, and 1,1-bis(t-butylperoxy)cyclododecane. The azo-based polymerization initiator is not limited, but examples thereof include 2,2'-azobisisobutyronitrile, 2,2'-azobis-2-methylbutyronitrile, 2,2'-azobis(2,4-dimethylvaleronitrile), 2,2'-azobis(2-methylpropionic acid)dimethyl, 2,2'-azobis(4-methoxy-2,4-dimethylvaleronitrile), 1,1'-azobis(cyclohexane-1-carbonitrile), 2,2'-azobis(2,4,4-trimethylpentane), 4,4'-azobis-4-cyanovaleric acid, 2,2'-azobis(2-amidinopropane) dihydrochloride, 2,2'-azobis[2-(5-methyl-2-imidazolin-2-yl)propane]dihydrochloride, 2,2'-azobis(2-methylpropionamidine) disulfate, 2,2'-azobis(N,N'-dimethyleneisobutylamidine) hydrochloride, and 2,2'-azobis[N-(2-carboxyethyl)-2-methylpropionamidine] hydrate. The polymerization initiator can be used alone or a combination of two or more kinds thereof may be used.

The amount of the polymerization initiator to be used is not limited, but is preferably 0.01 parts by mass or more and 5 parts by mass or less, to total monomer components (100 parts by mass) constituting the polymer. The upper limit of the amount of the polymerization initiator to be used is more preferably 3 parts by mass, and the lower limit thereof is more preferably 0.05 parts by mass.

The heating temperature in heating and polymerizing in the solution polymerization is not limited, but is, for example, 50° C. or higher and 80° C. or lower. The heating time is not limited, but is, for example, 1 hour or more and 24 hours or less.

The weight average molecular weight of the polymer is not limited, but is preferably 100,000 or more and 5,000,000 or less. The upper limit of the weight average molecular weight is more preferably 4,000,000 and still more preferably 3,000,000, and the lower limit thereof is more preferably 200,000 and still more preferably 300,000. 100,000 or more of the weight average molecular weight allows the cohesive force to be small, and this can effectively prevent the disadvantage that an adhesive residue remains on the surface of the adherend after debonding the adhesive layer. In addition, 5,000,000 or less of the weight average molecular weight can effectively prevent the disadvantage that wettability of the surface of the adherend after debonding the adhesive layer is insufficient.

The weight average molecular weight is obtained by measuring with a gel permeation chromatography (GPC) method. More specifically, for example, the weight average molecular weight can be measured using "HLC-8220GPC" (trade name, manufactured by Tosoh Corporation) as a GPC measuring device, under the following conditions and can be calculated from a standard polystyrene conversion value.

(Conditions for Measuring Weight Average Molecular Weight)

Sample concentration: 0.2% by mass (tetrahydrofuran solution)
Sample injection amount: 10 µL
Sample column: TSK guard column Super HZ-H (1 piece)+TSK gel Super HZM-H (2 pieces)
Reference column: TSK gel Super H-RC (1 piece)
Eluent: tetrahydrofuran (THF)
Flow rate: 0.6 mL/min
Detector: differential refractometer (RI)
Column temperature (measurement temperature): 40° C.

The glass transition temperature (Tg) of the polymer is not limited. 0° C. or lower of the glass transition temperature is preferable, as this allows for preventing the decrease in initial adhesive force. The glass transition temperature is more preferably −10° C. or lower, and still more preferably −20° C. or lower. In addition, −40° C. or lower the glass transition temperature is particularly preferable, as this allows the rate of decrease in adhesive force by voltage application to be particularly large. The glass transition temperature is most preferably −50° C. or lower.

The glass transition temperature (Tg) can be calculated, for example, based on the following formula (Y) (Fox formula).

$$1/Tg = W1/Tg1 + W2/Tg2 + \ldots + Wn/Tgn \quad (Y)$$

[In the formula (Y), Tg represents a glass transition temperature (unit: K) of the polymer, Tg1 (i=1, 2, . . . n) represents a glass transition temperature (unit: K) of the polymer when a homopolymer has been formed of a monomer i, and W1 (i=1, 2, . . . n) represents a weight fraction in the total monomer components of the monomer i]

The formula (Y) is a calculation formula in a case where the polymer is formed of n kinds (monomer 1, monomer 2, . . . monomer n) of monomer components.

The glass transition temperature when the homopolymer has been formed means a glass transition temperature of a homopolymer of the monomer and means a glass transition temperature (Tg) of a polymer that is formed of only a certain monomer (referred to as "monomer X" in some cases) as the monomer component. Specifically, numerical values are exemplified in "Polymer Handbook" (Third Edition, John Wiley & Sons, Inc, 1989). The glass transition temperature (Tg) of a homopolymer not described in the above-described literature is, for example, a value obtained by the following measuring method. That is, 100 parts by mass of the monomer X, 0.2 parts by mass of 2,2'-azobisisobutyronitrile, and 200 parts by mass of ethyl acetate as a polymerization solvent are charged into a reactor equipped with a thermometer, a stirrer, a nitrogen inlet tube, and a reflux condenser, and are stirred for 1 hour with a nitrogen gas introduced. In this manner, oxygen in a polymerization system is removed, and then, the temperature is raised to 63° C. and a reaction is performed for 10 hours. Next, the temperature is cooled to room temperature and thus a homopolymer solution having a solid content concentration of 33% by mass is obtained. Next, the homopolymer solution is coated onto a release liner by flow casting, and dried to prepare a test sample (sheet-shaped homopolymer) having a thickness of approximately 2 mm. Then, approximately 1 to 2 mg of the test sample is weighed into an open cell made of aluminum to measure the behavior of reversing heat flow (specific heat component) of the homopolymer using a temperature-modulated DSC (trade name "Q-2000" manufactured by TA Instruments) at a temperature rising rate of 5° C./min in 50 ml/min of a nitrogen atmosphere. With reference to JIS-K-7121, a temperature at the point where a straight line equidistant in a vertical axis direction from straight lines which are obtained by extending a baseline on a high temperature side and a baseline on the low temperature side of the obtained reversing heat flow, intersects with a curve of a portion in which the glass transition changes stepwise, is set as the glass transition temperature (Tg) when the homopolymer has been formed.

The content of the polymer in the adhesive composition of the present embodiment is preferably 50% by mass or more and 99.9% by mass or less, to the total amount (100% by mass) of the adhesive composition. The upper limit of the content is more preferably 99.5% by mass and still more preferably 99% by mass, and the lower limit thereof is more preferably 60% by mass and still more preferably 70% by mass.

(Ionic Liquid)

The ionic liquid in the present embodiment is constituted of a pair of an anion and a cation, and is not limited so long as it is a molten salt that is liquid at 25° C. (room temperature molten salt). Examples of the anion and the cation are given below. Among ionic substances obtained by combining the anion and the cation, the one that is liquid at 25° C. is an ionic liquid, and the one that is solid at 25° C. is not an ionic liquid but an ionic solid described later.

Examples of the anion of the ionic liquid include $(FSO_2)_2N^-$, $(CF_3SO_2)_2N^-$, $(CF_3CF_2SO_2)_2N^-$, $(CF_3SO_2)_3C^-$, $Br^-$, $AlCl_4^-$, $Al_2Cl_7^-$, $NO_3^-$, $BF_4^-$, $PF_6^-$, $CH_3COO-$, $CF_3COO-$, $CF_3CF_2CF_2COO-$, $CF_3SO_3$, $CF_3(CF_2)_3SO_3^-$, $AsF_6^-$, $SbF_6^-$, and $F(HF)_n^-$. Among these, anions of a sulfonyl imide-based compound such as $(FSO_2)_2N^-$ [bis(fluorosulfonyl)imide an ion] or $(CF_3SO_2)_2N^-$ [bis(trifluoromethanesulfonyl)imide anion] are preferred as the anion since the anions are chemically stable and suitable in improving the electrical debondability.

As the cation in the ionic liquid, nitrogen-containing onium, sulfur-containing onium and phosphorus-containing onium cations are preferred as they are chemically stable and suitable in improving the electrical debondability. Imidazolium-based, ammonium-based, pyrrolidinium-based and pyridinium-based cations are more preferred.

Examples of the imidazolium-based cation include 1-methylimidazolium cation, 1-ethyl-3-methylimidazolium cation, 1-propyl-3-methylimidazolium cation, 1-butyl-3-methylimidazolium cation, 1-pentyl-3-methylimidazolium cation, 1-hexyl-3-methylimidazolium cation, 1-heptyl-3-methylimidazolium cation, 1-octyl-3-methylimidazolium cation, 1-nonyl-3-methylimidazolium cation, 1-undecyl-3-methylimidazolium cation, 1-dodecyl-3-methylimidazolium cation, 1-tridecyl-3-methylimidazolium cation, 1-tetradecyl-3-methylimidazolium cation, 1-pentadecyl-3-methylimidazolium cation, 1-hexadecyl-3-methylimidazolium cation, 1-heptadecyl-3-methylimidazolium cation, 1-octadecyl-3-methylimidazolium cation, 1-undecyl-3-methylimidazolium cation, 1-benzyl-3-methylimidazolium cation, 1-butyl-2,3-dimethylimidazolium cation, and 1,3-bis(dodecyl)imidazolium cation.

Examples of the pyridinium-based cation include 1-butylpyridinium cation, 1-hexylpyridinium cation, 1-butyl-3-methylpyridinium cation, 1-butyl-4-methylpyridinium cation, and 1-octyl-4-methylpyridinium cation.

Examples of the pyrrolidinium-based cation include 1-ethyl-1-methylpyrrolidinium cation, and 1-butyl-1-methylpyrrolidinium cation.

Examples of the ammonium-based cation include tetraethylammonium cation, tetrabutylammonium cation, methyltrioctylammonium cation, tetradecytrihexylammonium cation, glycidyltrimethylammonium cation, and trimethylaminoethyl acrylate cation.

As the ionic liquid, it is preferable to select a cation having a molecular weight of 160 or less as the constituent cation, from the viewpoint of increasing the rate of decrease in adhesive force during voltage application. The ionic liquid containing the above-described $(FSO_2)_2N^-$ [bis(fluorosulfonyl)imide anion] or $(CF_3SO_2)_2N$-[bis(trifluoromethanesulfonyl)imide anion] and a cation having a molecular weight of 160 or less is particularly preferred. Examples of the cation having a molecular weight of 160 or less include 1-methylimidazolium cation, 1-ethyl-3-methylimidazolium cation, 1-propyl-3-methylimidazolium cation, 1-butyl-3-methylimidazolium cation, 1-pentyl-3-methylimidazolium cation, 1-butylpyridinium cation, 1-hexylpyridinium cation, 1-butyl-3-methylpyridinium cation, 1-butyl-4-methylpyridinium cation, 1-ethyl-1-methylpyrrolidinium cation, 1-butyl-1-methylpyrrolidinium cation, tetraethylammonium cation, glycidyltrimethylammonium cation, and trimethylaminoethyl acrylate cation.

The cations represented by the following Formulas (2-A) to (2-D) are preferred as the cation in the ionic liquid.

[Chem. 1]

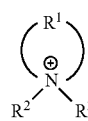

(2-A)

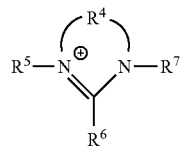

(2-B)

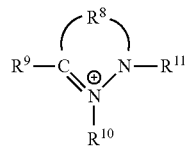

(2-C)

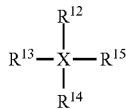

(2-D)

In the Formula (2-A), $R^1$ represents a hydrocarbon group having 4 to 10 carbon atoms (preferably a hydrocarbon group having 4 to 8 carbon atoms and more preferably a hydrocarbon group having 4 to 6 carbon atoms) and may contain a hetero atom, $R^2$ and $R^3$ may be the same or different, represent a hydrogen atom or a hydrocarbon group having 1 to 12 carbon atoms (preferably a hydrocarbon group having 1 to 8 carbon atoms, more preferably a hydrocarbon group having 2 to 6 carbon atoms, and still more preferably a hydrocarbon group having 2 to 4 carbon atoms), and may contain a hetero atom. When a nitrogen atom forms a double bond with an adjacent carbon atom, $R^3$ is not present.

In the Formula (2-B), $R^4$ represents a hydrocarbon group having 2 to 10 carbon atoms (preferably a hydrocarbon group having 2 to 8 carbon atoms and more preferably a hydrocarbon group having 2 to 6 carbon atoms) and may contain a hetero atom, and $R^5$, $R^6$, and $R^7$ may be the same or different, represent a hydrogen atom or a hydrocarbon group having 1 to 12 carbon atoms (preferably a hydrocarbon group having 1 to 8 carbon atoms, more preferably a hydrocarbon group having 2 to 6 carbon atoms, and still more preferably a hydrocarbon group having 2 to 4 carbon atoms), and may contain a hetero atom.

In the Formula (2-C), $R^8$ represents a hydrocarbon group having 2 to 10 carbon atoms (preferably a hydrocarbon group having 2 to 8 carbon atoms and more preferably a hydrocarbon group having 2 to 6 carbon atoms) and may contain a hetero atom, and $R^9$, $R^{10}$, and $R^{11}$ may be the same or different, represent a hydrogen atom or a hydrocarbon group having 1 to 16 carbon atoms (preferably a hydrocarbon group having 1 to 10 carbon atoms and more preferably a hydrocarbon group having 1 to 8 carbon atoms), and may contain a hetero atom.

In the Formula (2-D), X represents a nitrogen atom, a sulfur atom or a phosphorus atom, and $R^{12}$, $R^{13}$, $R^{14}$, and $R^{15}$ may be the same or different, represent a hydrocarbon group having 1 to 16 carbon atoms (preferably a hydrocarbon group having 1 to 14 carbon atoms, more preferably a hydrocarbon group having 1 to 10 carbon atoms, still more preferably a hydrocarbon group having 1 to 8 carbon atoms, and particularly preferably a hydrocarbon group having 1 to 6 carbon atoms), and may contain a hetero atom. When X is a sulfur atom, $R^{12}$ is not present.

The molecular weight of the cation in the ionic liquid is, for example, 500 or less, preferably 400 or less, more preferably 300 or less, still more preferably 250 or less, particularly preferably 200 or less, and most preferably 160 or less. In addition, the molecular weight is typically 50 or more. It is considered that the cation in the ionic liquid has the property to move to a cathode side in the adhesive layer during voltage application and deviate to the vicinity of the interface between the adhesive layer and the adherend. Thus, in the present invention, the adhesive force during voltage application is decreased as compared with the initial adhesive force, and the electrical debondability occurs. The cation having a small molecular weight of 500 or less is further easy to move to the cathode side in the adhesive layer, and is suitable in increasing the rate of decrease in adhesive force during the voltage application.

Examples of commercially available products of the ionic liquid include "ELEXCEL AS-110", "ELEXCEL MP-442", "ELEXCEL IL-210", "ELEXCEL MP-471", "ELEXCEL MP-456" and "ELEXCEL AS-804" (trade names, manufactured by DKS Co. Ltd.); "HMI-FSI" (trade name, manufactured by Mitsubishi Materials Corporation); and "CIL-312" and "CIL-313" (trade names, manufactured by Japan Carlit Co., Ltd.)

The ionic conductivity of the ionic liquid is preferably 0.1 mS/cm or more and 10 mS/cm or less. The upper limit of the ionic conductivity is more preferably 5 mS/cm, and still more preferably 3 mS/cm, and the lower limit thereof is more preferably 0.3 mS/cm, and still more preferably 0.5 mS/cm. When the ionic liquid has the ionic conductivity within this range, the adhesive force is sufficiently decreased even in a low voltage. The ionic conductivity can be measured by an AC impedance method using, for example, 1260 frequency response analyzer manufactured by Solartron.

The content (blending amount) of the ionic liquid in the adhesive composition of the present embodiment is preferably 0.5 parts by mass or more per 100 parts by mass of the polymer from the viewpoint of decreasing the adhesive force during voltage application and is preferably 30 parts by mass or less per 100 parts by weight of the polymer from the viewpoint of increasing the initial adhesive force. From the same viewpoints, the content is more preferably 20 parts by mass or less, still more preferably 15 parts by mass or less, particularly preferably 10 parts by mass or less, and most preferably 5 parts by mass or less. In addition, the content is more preferably 0.6 parts by mass or more, still more preferably 0.8 parts by mass or more, particularly preferably 1.0 part by mass or more, and most preferably 1.5 parts by mass or more.

(Other Components)

The adhesive composition of the present embodiment may contain one or more components other than the polymer and the ionic liquid (hereinafter, may also be referred to as "other components"), if necessary, as long as the effects of the present invention are not impaired. Hereinafter, other components that may be contained in the adhesive composition of the present embodiment will be described.

The adhesive composition of the present embodiment may contain an ionic additive for the purpose of controlling the relative permittivity, the ionic conductivity, and the capacitance. As the ionic additive, for example, an ionic solid can be used.

The ionic solid is an ionic substance that is solid at 25° C. The ionic solid is not limited, but for example, among ionic substances obtained by combining the anions and cations exemplified in the above-mentioned description for the ionic liquid, the solid ones can be used. When the adhesive composition contains an ionic solid, the content of the ionic solid is preferably 0.5 parts by mass or more, and more preferably 1 part by mass or more, and is preferably 10 parts by mass or less, more preferably 5 parts by mass or less, and still more preferably 2.5 parts by mass or less, per 100 parts by mass of the polymer.

The adhesive composition of the present embodiment may contain a crosslinking agent, if necessary, for the purpose of improving creeping property or shear property by crosslinking the polymers. Examples of the crosslinking agent include an isocyanate-based crosslinking agent, an epoxy-based crosslinking agent, a melamine-based crosslinking agent, a peroxide-based crosslinking agent, a ureabased crosslinking agent, a metal alkoxide-based crosslinking agent, a metal chelate-based crosslinking agent, a metal salt-based crosslinking agent, an oxazoline-based crosslinking agent, an aziridine-based crosslinking agent, and an amine-based crosslinking agent. Examples of the isocyanate-based crosslinking agent include toluene diisocyanate and methylene bisphenyl isocyanate. Examples of the epoxy-based crosslinking agent include N,N,N',N'-tetraglycidyl-m-xylenediamine, diglycidylaniline, 1,3-bis(N,N-diglycidylaminomethyl) cyclohexane, and 1,6-hexanediol diglycidyl ether. When the crosslinking agent is contained, the content thereof is preferably 0.1 parts by mass or more, and more preferably 0.7 parts by mass or more, and is preferably 50 parts by mass or less, more preferably 10 parts by mass or less, and still more preferably 3 parts by mass or less, per 100 parts by mass of the polymer. The crosslinking agent can be used alone or a combination of two or more kinds thereof may be used.

The adhesive composition of the present embodiment may contain polyethylene glycol and/or tetraethylene glycol dimethyl ether, if necessary, for the purpose of assisting the movement of the ionic liquid during voltage application. Those having a number average molecular weight of 100 to 6,000 can be used as polyethylene glycol and tetraethylene glycol dimethyl ether. When these components are contained, the content thereof is preferably 0.1 parts by mass or more, more preferably 0.5 parts by mass or more, and still more preferably 1 part by mass or more, and is preferably 30 parts by mass or less, more preferably 20 parts by mass or less, and still more preferably 15 parts by mass or less, per 100 parts by mass of the polymer.

The adhesive composition of the present embodiment may contain a conductive filler, if necessary, for the purpose of imparting conductivity to the adhesive composition. The conductive filler is not limited, but as the filler, the general and/or conventional conductive fillers can be used. For example, graphite, carbon black, carbon fiber, and a metal powder such as silver or copper can be used. When the conductive filler is contained, the content thereof is preferably 0.1 parts by mass or more and 200 parts by mass or less, per 100 parts by mass of the polymer.

The adhesive composition of the present embodiment may contain a corrosion inhibitor, if necessary, for the purpose of inhibiting corrosion of a metal adherend. The corrosion inhibitor is not limited, but as the corrosion inhibitor, the general and/or conventional corrosion inhibitors can be used. For example, a carbodiimide compound, an adsorption-type inhibitor, and a chelate-forming metal inactivating agent can be used.

Examples of the carbodiimide compound include 1-[3-(dimethylamino)propyl]-3-ethyl carbodiimide, 1-ethyl-3-(3-dimethylaminopropyl) carbodiimide, N,N'-dicyclohexyl carbodiimide, N,N'-diisopropyl carbodiimide, 1-ethyl-3-tert-butyl carbodiimide, N-cyclohexyl-N'-(2-morpholinoethyl) carbodiimide, N,N'-di-tert-butyl carbodiimide, 1,3-bis(p-tolyl) carbodiimide, and a polycarbodiimide resin using these as monomers. The carbodiimide compound can be used alone or a combination of two or more kinds thereof may be used. When the carbodiimide compound is contained in the adhesive composition of the present embodiment, the content thereof is preferably 0.01 parts by mass or more and 10 parts by mass or less, per 100 parts by mass of the polymer.

Examples of the adsorption-type inhibitor include an alkylamine, a carboxylic acid salt, a carboxylic acid derivative, and an alkyl phosphate salt. The adsorption-type inhibitor can be used alone or a combination of two or more kinds thereof may be used. When the alkylamine is contained as the adsorption-type inhibitor in the adhesive composition of the present embodiment, the content thereof is preferably 0.01 parts by mass or more and 20 parts by mass or less, per 100 parts by mass of the polymer. When the carboxylic acid salt is contained as the adsorption-type inhibitor in the adhesive composition of the present embodiment, the content thereof is preferably 0.01 parts by mass or more and 10 parts by mass or less, per 100 parts by mass of the polymer. When the carboxylic acid derivative is contained as the adsorption-type inhibitor in the adhesive composition of the present embodiment, the content thereof is preferably 0.01 parts by mass or more and 10 parts by mass or less, per 100 parts by mass of the polymer. When the alkyl phosphate salt is contained as the adsorption-type inhibitor in the adhesive composition of the present embodiment, the content thereof is preferably 0.01 parts by mass or more and 10 parts by mass or less, per 100 parts by mass of the polymer.

As the chelate-forming metal inactivating agent, for example, a triazole group-containing compound or a benzotriazole group-containing compound can be used. These components are preferred as they have a high effect of inactivating the surface of metals such as aluminum and do not easily influence the adhesiveness even if contained in the adhesive component. The chelate-forming metal inactivating agent can be used alone or a combination of two or more kinds thereof may be used. When the chelate-forming metal inactivating agent is contained in the adhesive composition of the present embodiment, the content thereof is preferably 0.01 parts by mass or more and 20 parts by mass or less, per 100 parts by mass of the polymer.

The total content (blending amount) of the corrosion inhibitor is preferably 0.01 parts by mass or more and 30 parts by mass or less, per 100 parts by mass of the polymer.

The adhesive composition of the present embodiment may further contain, if necessary, various additives such as a filler, a plasticizer, an age resister, an antioxidant, a pigment (a dye), a flame retardant, a solvent, a surfactant (leveling agent), a rust inhibitor, a tackifying resin, and an antistatic agent. The total content of these components is not limited as long as the effects of the present invention are exhibited, but is preferably 0.01 parts by mass or more and 20 parts by mass or less, more preferably 10 parts by mass or less, and still more preferably 5 parts by mass or less, per 100 parts by mass of the polymer.

Examples of the filler include silica, iron oxide, zinc oxide, aluminum oxide, titanium oxide, barium oxide, magnesium oxide, calcium carbonate, magnesium carbonate, zinc carbonate, pyrophyllite clay, kaolin clay, and calcined clay.

As the plasticizer, the conventional plasticizers that are used the typical resin compositions can be used. Examples thereof include: oils such as paraffin oil and process oil; liquid rubber such as liquid polyisoprene, liquid polybutadiene, and liquid ethylene-propylene rubber; tetrahydrophthalic acid, azelaic acid, benzoic acid, phthalic acid, trimellitic acid, pyromellitic acid, adipic acid, sebacic acid, fumaric acid, maleic acid, itaconic acid, citric acid and derivatives thereof; dioctyl phthalate (DOP), dibutyl phthalate (DBP), dioctyl adipate, diisononyl adipate (DINA), and isodecyl succinate.

Examples of the age resister include hindered phenol-based compounds, and aliphatic or aromatic hindered amine-based compounds.

Examples of the antioxidant include butylhydroxytoluene (BHT) and butylhydroxyanisole (BHA).

Examples of the pigment include an inorganic pigment such as titanium dioxide, zinc oxide, ultramarine, red iron oxide, lithopone, lead, cadmium, iron, cobalt, aluminum, hydrochloride or sulfate, and an organic pigment such as an azo pigment or a copper phthalocyanine pigment.

Examples of the rust inhibitor include zinc phosphate, a tannic acid derivative, phosphate, basic sulfonate, and various rust preventive pigments.

Examples of the adhesion-imparting agent include a titanium coupling agent and a zirconium coupling agent.

Examples of the antistatic agent include, in general, a quaternary ammonium salt or a hydrophilic compound such as polyglycolic acid or ethylene oxide derivative.

Examples of the tackifying resin include a polyamide-based tackifying resin, an epoxy-based tackifying resin and an elastomer-based tackifying resin, in addition to a rosin-based tackifying resin, a terpene-based tackifying resin, a phenol-based tackifying resin, a hydrocarbon-based tackifying resin and a ketone-based tackifying resin. The tackifying resin can be used alone or a combination of two or more kinds thereof may be used.

<Relative Permittivity of Ionic Liquid-Free Adhesive Layer>

In the adhesive composition of the first embodiment, when an adhesive layer (ionic liquid-free adhesive layer) is formed of a composition (ionic liquid-free adhesive composition) composed of components other than the ionic liquid among components contained in the adhesive composition, the adhesive layer has a relative permittivity of 5 or more at a frequency of 100 Hz after being left to stand in an environment of 22° C. and 20% RH for 3 days.

The above-mentioned relative permittivity means the relative permittivity measured as follows.

First, the ionic liquid-free adhesive composition is uniformly coated onto a release surface of a separator whose surface is subjected to a release treatment, and dried by heating at 130° C. for 3 minutes, thereby obtaining an ionic liquid-free adhesive layer having a thickness of 30 μm. Next, the obtained ionic liquid-free adhesive layer is left to stand in an environment of 22° C. and 20% RH for 3 days. Thereafter, the relative permittivity is measured under the following conditions.

(Conditions for Measuring Relative Permittivity)
  Measurement method: capacitance method (device: 4294A Precision Impedance Analyzer, Agilent Technologies)
  Electrode configuration: aluminum plate having a diameter of 12.1 mmφ and a thickness of 0.5 mm
  Counter electrode: aluminum foil having a thickness of 60 μm
  Measurement environment: 23±1C, 52±1% RH The relative permittivity of the ionic liquid-free adhesive layer has a correlation with the mobility of the ionic liquid in the adhesive layer formed of the adhesive composition containing the ionic liquid. The larger relative permittivity of the ionic liquid-free adhesive layer equates to the easier movement of the ionic liquid in the adhesive layer formed of the adhesive composition containing the ionic liquid, and thus, equates to the easier decrease in the adhesive force in applying a voltage.

The ionic liquid-free adhesive layer formed of the adhesive composition according to the first embodiment has a relative permittivity of 5 or more at a frequency of 100 Hz after the adhesive layer is left to stand in an environment of 22° C. and 20% RH for 3 days, and thus this allows for forming an adhesive whose adhesive force is sufficiently decreased by applying a voltage even in a low humidity environment.

The relative permittivity of the ionic liquid-free adhesive layer can be controlled, for example, by appropriately adjusting the polymer component in the adhesive composition and the type and content of the ionic additive within the above-mentioned preferred ranges.

<Ionic Conductivity of Adhesive Layer and Capacitance Per Unit Area of Interface Between Adhesive Layer and Adherend>

In the adhesive composition of the second embodiment, when an adhesive layer is formed of the adhesive composition, the adhesive layer has a capacitance per unit area of an interface between the adhesive layer and the aluminum plate of 0.9 μF/cm$^2$ or more, and an ionic conductivity of 10 μS/m or more after being adhered to an aluminum plate made of A5052P H32 in JIS H4000:2014 and left to stand in an environment of 22° C. and 15% RH for 7 days.

The ionic conductivity of the adhesive layer has a correlation with the mobility of the ionic liquid in the adhesive layer. The larger ionic conductivity allows for the easier movement of the ionic liquid. In addition, the capacitance per unit area of the interface between the adhesive layer and the adherend has a correlation with the easiness of the ionic liquid to be present at the interface between the adhesive layer and the adherend. The larger capacitance equates to the more easiness of the ionic liquid to be present at the interface between the adhesive layer and the adherend.

The adhesive layer formed of the adhesive composition according to the second embodiment has a capacitance per unit area of the interface between the adhesive layer and the aluminum plate of 0.9 μF/cm$^2$ or more and an ionic conductivity of 10 μS/m or more after being adhered to the aluminum plate made of A5052P H32 in JIS H4000: 2014 and left to stand in an environment of 22° C. and 15% RH for 7 days, and thus this allows for forming an adhesive whose adhesive force is sufficiently decreased by applying a voltage even in a low humidity environment. The capacitance per unit area is more preferably 1.2 μF/cm$^2$ or more and the ionic conductivity of the adhesive layer is more preferably 20 μS/m or more.

The ionic conductivity and the capacitance can be controlled, for example, by appropriately adjusting the polymer component in the adhesive composition, the type and content of the ionic liquid, and the type and content of the ionic additive within the above-mentioned preferred ranges.

The above-mentioned ionic conductivity and capacitance mean the ionic conductivity and capacitance measured as follows.

(Preparation of Measurement Sample (Composite Sample))

First, the adhesive composition is uniformly coated onto an aluminum-deposited surface side of an aluminum-deposited PET film 100 (trade name "Metalumy-TS" manufactured by TORAY ADVANCED FILM CO., LTD.). At this time, in order to bring the electrode into contact with the aluminum-deposited surface, a portion where the adhesive composition is not coated is formed. Next, an adhesive layer 200 is formed by heating and drying the resultant one at 130° C. for 3 minutes to obtain an adhesive sheet sample.

Figure 5:
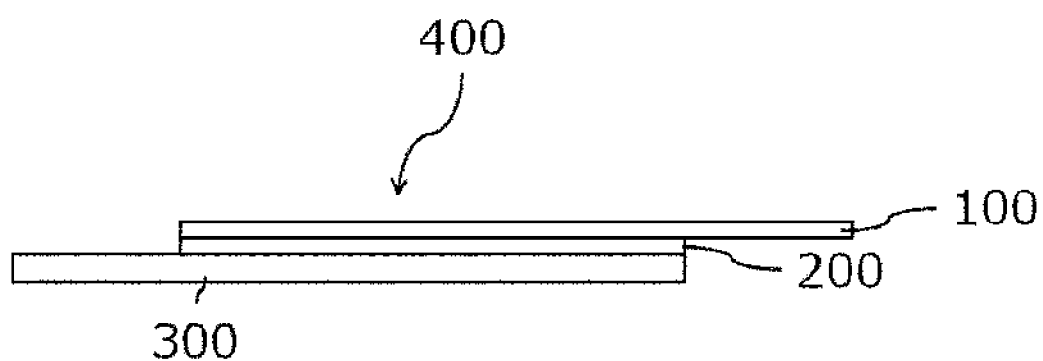
FIG. 5 is a side view of a composite sample for measuring a capacitance and an ionic conductivity.
Figure 6:
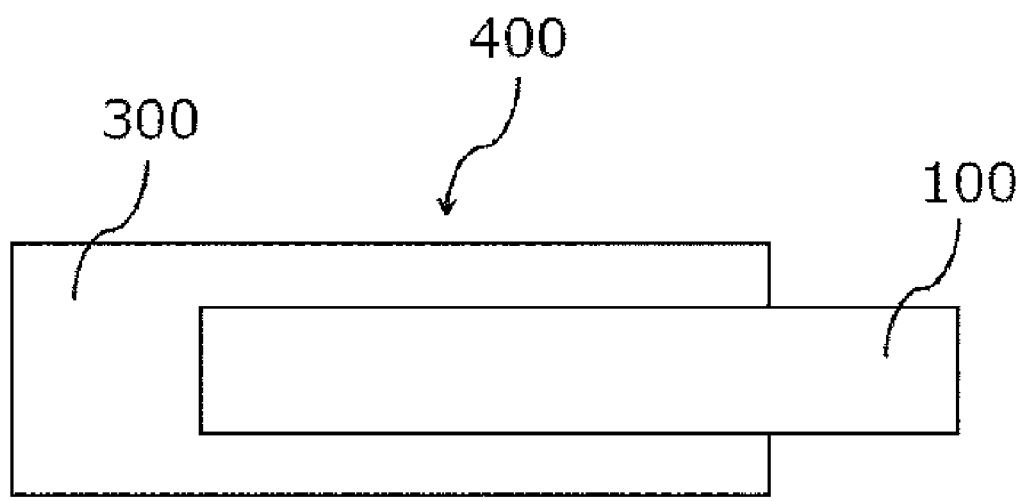
FIG. 6 is a top view of the composite sample for measuring the capacitance and the ionic conductivity.

Thereafter, the adhesive surface of the obtained adhesive sheet sample is adhered to an aluminum plate 300 (A5052P H32 (JIS H4000:2014)) to obtain an adhered body sample 400 having a shape as shown in FIGS. 5 and 6. FIG. 5 is a side view and FIG. 6 is a top view.

(Measurement of Capacitance and Ionic Conductivity)

An LCR meter (for example, IM3533 manufactured by HIOKI E.E.CORPORATION) is used for measuring the capacitance and the ionic conductivity.

First, an AC voltage of 0.5 V is applied between the aluminum plate 300 and the aluminum-deposited surface of the aluminum-deposited PET film 100 using an LCR meter, and the frequency is changed from 0.5 Hz to 200 kHz to obtain a cole-cole plot.

Figure 7:
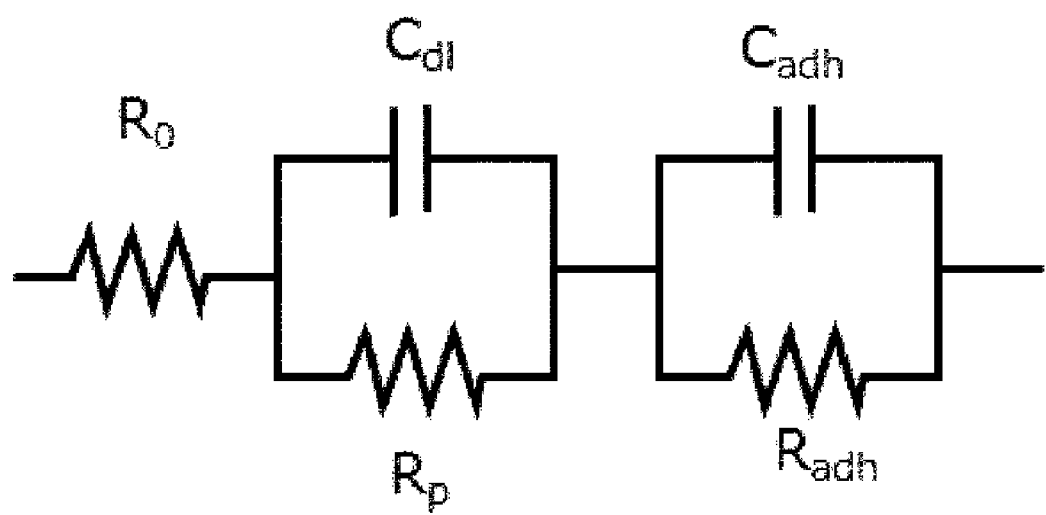
FIG. 7 is an equivalent circuit diagram of the composite sample for measuring the capacitance and the ionic conductivity.

Next, the bulk of the adhesive layer 200 is regarded as a parallel circuit of a resistance component $R_{adh}$ and a capacitance component $C_{adh}$, the interface of the adhesive layer 200 is regarded as a parallel circuit of a resistance component $R_p$ and a capacitance component $C_{dl}$, an equivalent circuit of the adhered body sample is set as shown in FIG. 7, and the obtained cole-cole plot is fitted by the following equation (A). A resistance component $R_0$ is a wiring resistance.

[Eq. 1]
$$Z = R_0 + \frac{R_p}{\left(\cos\frac{\pi}{2}\alpha_1 + i\cdot\sin\frac{\pi}{2}\alpha_1\right)\cdot\omega^{\alpha_1}\cdot C_{dl} + 1} + \frac{R_{adh}}{\left(\cos\frac{\pi}{2}\alpha_2 + i\cdot\sin\frac{\pi}{2}\alpha_2\right)\cdot\omega^{\alpha_2}\cdot C_{adh} + 1} \quad (A)$$

In the equation (A), ω represents an angular frequency.

By dividing the obtained $C_{dl}$ by an area A of the adhesive surface of the adhesive layer 200, the capacitance per unit area of the interface between the adhesive layer 200 and the aluminum plate 300 can be obtained.

Next, the ionic conductivity a of the adhesive layer can be obtained according to the following equation (B) using a resistance component $R_{adh}$ of the bulk of the adhesive layer 200 obtained from the equation (A).

[Eq. 2]
$$R_{adh} = \frac{1}{\sigma}\cdot\frac{l}{A} \quad (B)$$

In the equation (B), l represents the thickness of the adhesive layer, and A represents the area of the adhesive surface of the adhesive layer 200.

<Initial Adhesive Force and Rate of Decrease in Adhesive Force by Voltage Application>

The adhesive force of the adhesive composition of the present embodiment can be evaluated by various methods. For example, it can be evaluated by a 1800 peel test described in Examples.

The adhesive composition of the present embodiment preferably has an initial adhesive force of 1.0 N/cm or more, more preferably 1.5 N/cm or more, still more preferably 2.0 N/cm or more, particularly preferably 2.5 N/cm or more, and most preferably 3.0 N/cm or more, which is measured by performing a 1800 peel test after an adhesive sheet is formed as described in Examples. When the initial adhesive force is 1.0 N/cm or more, the adhesion to the adherend is sufficient, and the adherend is unlikely to be debonded or displaced.

Preferably, in the adhesive composition of the present embodiment, after an adhesive sheet is formed as described in Examples, is left to stand in an environment of a predetermined temperature and humidity for a predetermined period, and is applied with a voltage of 10 V for 30 seconds, the adhesive force measured by the 1800 peel test with a voltage of 10 V applied is sufficiently smaller than the initial adhesive force.

That is, the rate of decrease in adhesive force obtained by the following equation (C) based on the adhesive force (simply expressed as "adhesive force during voltage application" in the following equation (C)) measured by the above method and the initial adhesive force is preferably 60% or more, more preferably 70% or more, and still more preferably 80% or more. The predetermined temperature, humidity and period are preferably 22° C. and 20% RH for 3 days, and more preferably 22° C. and 15% RH for 7 days.

Rate of decrease in adhesive force (%)={1−(adhesive force during voltage application/initial adhesive force)}×100   (C)

The applied voltage and voltage application time during electrical debonding are not limited to those described above as long as the adhesive sheet can be debonded. Preferred ranges of those are described below.

The applied voltage is preferably 1 V or more, more preferably 3 V or more, and still more preferably 6 V or more. In addition, the applied voltage is preferably 100 V or less, more preferably 50 V or less, still more preferably 30 V or less, and particularly preferably 15 V or less.

The voltage application time is preferably 60 seconds or less, more preferably 40 seconds or less, still more preferably 20 seconds or less, and particularly preferably 10 seconds or less. In such a case, the workability is excellent. Shorter application time is preferred, but the application time is generally 1 second or more.

<Method for Producing Adhesive Composition>

The adhesive composition of the present invention can be produced by appropriately stirring and mixing the polymer, the ionic liquid and the additives, and a crosslinking agent, polyethylene glycol, a conductive filler and the like, which are blended therewith if necessary, but the production method is not limited.

[Adhesive Sheet]

(Configuration of Adhesive Sheet)

The adhesive sheet of the present embodiment is not limited as long as it has at least one adhesive layer (hereinafter, also referred to as "electrically debondable adhesive layer") formed of the adhesive composition of the present embodiment described above. The adhesive sheet of the present embodiment may have an adhesive layer (hereinafter, may be referred to as "another adhesive layer") free of an ionic liquid, in addition to the electrically debondable adhesive layer. In addition to the above, the adhesive sheet of the present embodiment may include a substrate, a conductive layer, a conduction substrate, an intermediate layer, an undercoat layer, and the like. The adhesive sheet of the present embodiment may be, for example, rolled in a roll shape or may be in a sheet shape. The "adhesive sheet" shall also include the meaning of "adhesive tape". That is, the adhesive sheet of the present embodiment may be an adhesive tape having a tape-like form.

The adhesive sheet of the present embodiment may be a double-sided adhesive sheet including only the electrically debondable adhesive layer without a substrate, that is, a (substrateless) double-sided adhesive sheet including no substrate layer. The adhesive sheet of the present embodiment may be a double-sided adhesive sheet including a substrate, both surfaces of the substrate being the adhesive layer (electrically debondable adhesive layer or another adhesive layer). The adhesive sheet of the present embodiment may be a single-sided adhesive sheet including a substrate, only one surface of the substrate being an adhesive layer (electrically debondable adhesive layer or another adhesive layer). The adhesive sheet of the present embodiment may include a separator (release liner) for protecting the surface of the adhesive layer, but the separator is not included in the adhesive sheet of the present embodiment.

Figure 2:
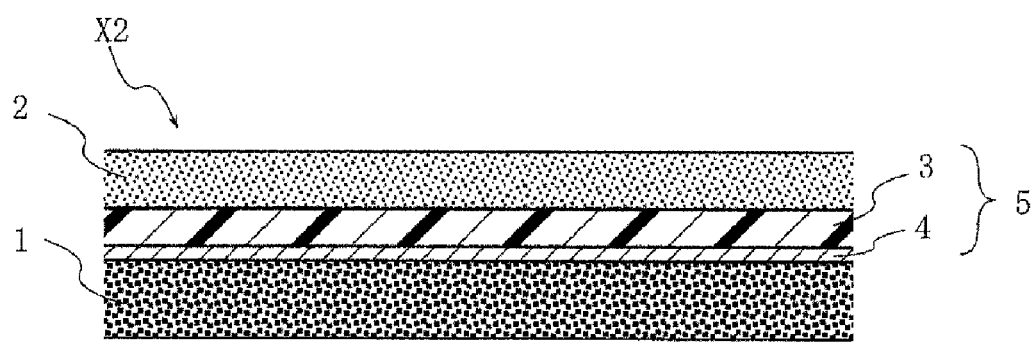
FIG. 2 is sectional view illustrating an example of a laminate structure of the adhesive sheet according to the present invention.
Figure 3:
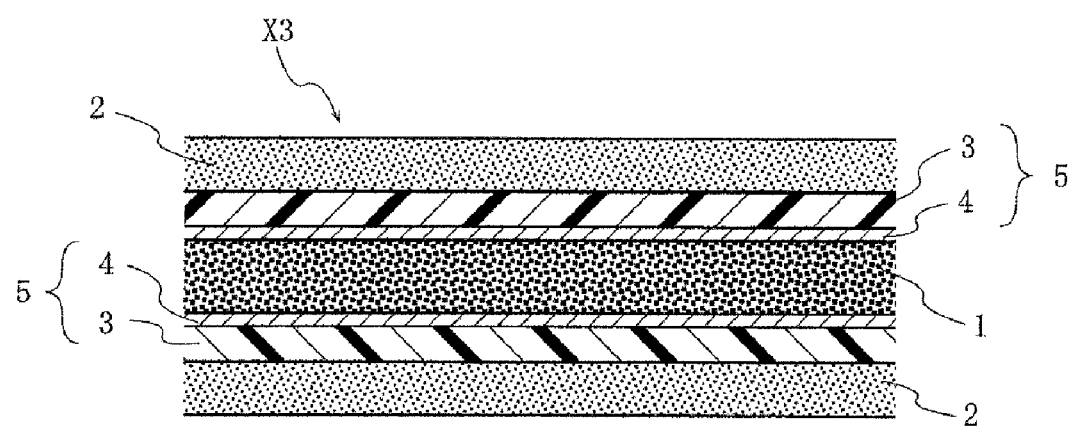
FIG. 3 is a sectional view illustrating another example of the laminate structure of the adhesive sheet according to the present invention.

The structure of the adhesive sheet of the present embodiment is not limited, but the adhesive sheet preferably includes an adhesive sheet X1 illustrated in FIG. 1, an adhesive sheet X2 in which a laminate structure is illustrated in FIG. 2, and an adhesive sheet X3 in which a laminate structure is illustrated in FIG. 3. The adhesive sheet X1 is a substrateless double-sided adhesive sheet including an electrically debondable adhesive layer 1 only. The adhesive sheet X2 is a substrate-attached double-sided adhesive sheet having a layer configuration including an adhesive layer 2, a conduction substrate 5 (substrate 3 and conductive layer 4), and the electrically debondable adhesive layer 1. The adhesive sheet X3 is a substrate-attached double-sided adhesive sheet having a layer configuration including the adhesive layer 2, the conduction substrate 5 (substrate 3 and conductive layer 4), the electrically debondable adhesive layer 1, another conduction substrate 5 (substrate 3 and conductive layer 4), and another adhesive layer 2. In the conduction substrate 5 of the adhesive sheets X2 and X3 illustrated in FIGS. 2 and 3, the substrate 3 is not essential and only the conductive layer 4 may be present. The adhesive sheet X2 in FIG. 2 may be a single-sided adhesive sheet free of the adhesive layer 2.

The substrate 3 is not limited, but examples thereof include a paper-based substrate such as paper, a fiber-based substrate such as cloth and nonwoven fabric, a plastic substrate such as a film or sheet made of various plastics (a polyolefin-based resin such as polyethylene and polypropylene, a polyester-based resin such as polyethylene terephthalate, an acrylic resin such as polymethyl methacrylate, and the like), and a laminate thereof. The substrate may have a form of a single layer and may have a form of multi-layers. The substrate may be subjected to, if necessary, various treatments such as a back-face treatment, an antistatic treatment, and an undercoating treatment.

The conductive layer 4 is not limited so long as it is a layer having conductivity, but may be a metal-based substrate such as a metal foil (for example, aluminum, magnesium, copper, iron, tin, and gold) and a metal plate (for example, aluminum, magnesium, copper, iron, tin, and silver), a conductive polymer, and the like. The conductive layer 4 may be a metal-deposited film provided on the substrate 3.

The conduction substrate 5 is not limited so long as it is a substrate having a conductive layer (carrying a current), but examples thereof include a substrate having a metal layer formed on a surface thereof. Examples thereof include one having a metal layer formed on a surface of the substrate exemplified above by a method such as a plating method, a chemical vapor deposition or sputtering. The metal layer includes the metal, metal plate and conductive polymer exemplified above.

It is preferred in the adhesive sheet X1 that the adherend at the both sides of the adhesive sheet is an adherend having a metal adherend surface. It is preferred in the adhesive sheet X2 that an adherend at the side of the electrically debondable adhesive layer 1 is an adherend having a metal adherend surface.

Examples of the metal adherend surface include a surface having conductivity and composed of a metal containing, for example, aluminum, copper, iron, magnesium, tin, gold, silver or lead as a main component. Among these, the surface composed of a metal containing aluminum is preferred. Examples of the adherend having a metal adherend surface include a sheet, a component, or a plate that is composed of a metal containing, for example, aluminum, copper, iron, magnesium, tin, gold, silver or lead as a main component. An adherend other than the adherend having a metal adherend surface is not limited, and examples thereof include a fiber sheet such as paper, cloth or nonwoven fabric, and a film or a sheet of various plastics.

The thickness of the electrically debondable adhesive layer 1 is preferably 1 μm or more and 1,000 μm or less from the viewpoint of the initial adhesive force. The upper limit of the thickness of the electrically debondable adhesive layer 1 is more preferably 500 μm, still more preferably 100 μm and particularly preferably 30 μm, and lower limit thereof is more preferably 3 μm, still more preferably 5 μm and particularly preferably 8 μm. When the adhesive sheet is a substrateless double-sided adhesive sheet including only the electrically debondable adhesive layer (adhesive sheet X1 shown in FIG. 1), the thickness of the electrically debondable adhesive layer is a thickness of the adhesive sheet.

The thickness of the adhesive layer 2 is preferably 1 μm or more and 2000 μm or less from the viewpoint of adhesive force. The upper limit of the thickness of the adhesive layer 2 is more preferably 1,000 μm, still more preferably 500 μm and particularly preferably 100 μm, and the lower limit thereof is more preferably 3 μm, still more preferably 5 μm and particularly preferably 8 μm.

The thickness of the substrate 3 is preferably 10 μm or more and 1,000 μm or less. The upper limit of the thickness is more preferably 500 μm, still more preferably 300 μm and particularly preferably 100 μm, and the lower limit thereof is more preferably 12 μm and still more preferably 25 μm.

The thickness of the conductive layer 4 is preferably 0.001 μm or more and 1,000 μm or less. The upper limit of the thickness is more preferably 500 μm, still preferably 300 μm, still more preferably 50 μm and still more preferably 10 μm, and the lower limit thereof is more preferably 0.01 μm, still more preferably 0.03 μm and still more preferably 0.05 μm.

The thickness of the conduction substrate 5 is preferably 10 μm or more and 1,000 μm or less. The upper limit of the thickness is more preferably 500 μm, still more preferably 300 μm and particularly preferably 100 μm, and the lower limit thereof is more preferably 12 μm and still more preferably 25 μm.

The surfaces of the electrically debondable adhesive layer of the adhesive sheet of the present embodiment and another adhesive layer may be protected by a separator (release liner). The separator is not limited, but examples thereof include a release liner in which the surface of a substrate (liner substrate) such as paper or plastic film has been silicone-treated, and a release liner in which the surface of a substrate (liner substrate) such as paper or plastic film has been laminated with a polyolefin-based resin. The thickness of the separator is not limited, but is preferably 10 μm or more and 100 μm or less.

The thickness of the adhesive sheet of the present embodiment is preferably 20 μm or more and 3,000 μm or less. The upper limit of the thickness is more preferably 1,000 μm, still more preferably 300 μm and particularly preferably 200 μm, and the lower limit thereof is more preferably 30 μm and still more preferably 50 μm.

In particular, for the adhesive sheet X2 shown in FIG. 2, the thickness of the adhesive sheet is preferably 50 μm or more and 2,000 μm or less. The upper limit of the thickness is more preferably 1,000 μm and still more preferably 200 μm, and the lower limit thereof is more preferably 80 μm and still more preferably 100 μm.

In particular, for the adhesive sheet X3 shown in FIG. 3, the thickness of the adhesive sheet is preferably 100 μm or more and 3,000 μm or less. The upper limit of the thickness is more preferably 1,000 μm and still more preferably 300 μm, and the lower limit thereof is more preferably 150 μm and still more preferably 200 μm.

(Method for Producing Adhesive Sheet)

As the method for producing the adhesive sheet of the present embodiment, a known or common production method can be used. For example, for the electrically debondable adhesive layer in the adhesive sheet of the present embodiment, a method in which a solution of the adhesive composition of the present embodiment which is dissolved in a solvent as needed is coated onto a separator and dried and/or cured may be used. In addition, for another adhesive layer, a method in which a solution of the adhesive composition free of the ionic liquid and the additive which is dissolved in a solvent as needed is coated onto a separator and dried and/or cured may be used. As the solvent and the separator, those described above can be used.

In coating, a common coater (for example, a gravure roll coater, a reverse roll coater, a kiss roll coater, a dip roll coater, a bar coater, a knife coater, and a spray roll coater) can be used.

The electrically debondable adhesive layer and another adhesive layer can be produced by the method described above, and the adhesive sheet of the present embodiment can be produced by appropriately laminating the electrically debondable adhesive layer and another adhesive layer on the substrate, the conductive layer and the conduction substrate. The adhesive sheet may be produced by coating the adhesive composition using the substrate, the conductive layer and the conduction substrate, instead of the separator.

(Electrical Debonding Method of Adhesive Sheet)

Debonding of the adhesive sheet of the present embodiment from an adherend can be performed by generating a potential difference in a thickness direction of the electrically debondable adhesive layer by applying a voltage to the electrically debondable adhesive layer. For example, when adherends having a metal adherend surface are present on both sides of the adhesive sheet X1, debonding can be performed by carrying a current to both metal adherend surfaces on both sides of the adhesive sheet and applying a voltage to the electrically debondable adhesive layer. When an adherend having a metal adherend surface is present on the electrically debondable adhesive layer side, debonding can be performed by carrying a current to the conductive adherend and the conductive layer 4 and applying a voltage to the electrically debondable adhesive layer. In the case of the adhesive sheet X3, debonding can be performed by carrying a current the conductive layers 4 on both surfaces of the adhesive layer and applying a voltage to the electrically debondable adhesive layer. The current-carrying is preferably performed by connecting terminals to one end and the other end of the adhesive sheet such that a voltage is applied to the entire electrically debondable adhesive layer. When the adherend has a metal adherend surface, the one end and the other end may be a part of the adherend having a metal adherend surface. When the adhesive sheet is debonded from the adherend, a voltage may be applied after adding water to the interface between the metal adherend surface and the electrically debondable adhesive layer.

(Uses of Adhesive Sheet)

The conventional debonding technology includes an adhesive layer that is cured by ultraviolet (UV) irradiation and debonded, and an adhesive layer that is debonded by heat. The adhesive sheet using such an adhesive layer cannot be used when ultraviolet (UV) irradiation is difficult or damages occurs in a member, which is an adherend, by heat. The adhesive sheet of the present embodiment having the electrically debondable adhesive layer does not use ultraviolet rays and heat, and thus debonding can be easily performed by applying a voltage without damaging a member, which is an adherend. Thus, the adhesive sheet of the present embodiment is suitable for use in fixation of a secondary battery (for example, lithium ion battery pack) used in a mobile device such as a smart phone, mobile phone, a notebook computer, a video camera or a digital camera, to a case.

Examples of a rigid member to be adhered by the adhesive sheet of the present embodiment include a silicon substrate, a sapphire substrate for LED, an SiC substrate and a metal base substrate for use in a semiconductor wafer; a TFT substrate and a color filter substrate for a display; and a base substrate for an organic EL panel. Examples of a brittle member to be adhered by a double-sided adhesive sheet include a semiconductor substrate such as a compound semiconductor substrate; a silicon substrate for use in MEMS device, a passive matrix substrate, a surface cover glass, OGS (One Glass Solution) substrate in which the cover glass is provided on a touch panel sensor, an organic substrate and an organic/inorganic hybrid substrate including silsesquioxane as a main component for a smart phone; a flexible glass substrate for a flexible display; and a graphene sheet.

[Adhered Body]

An adhered body of the present embodiment has a laminate structure part including an adherend having a metal adherend surface, and an adhesive sheet having an electrically debondable adhesive layer adhered to the metal adherend surface. Examples of the adherend having a metal adherend surface include those made of metals containing, for example, aluminum, copper, iron, magnesium, tin, silver, and lead as a main component. Among these, a metal containing aluminum is preferred.

Examples of the adhered body of the present embodiment include an adhered body including the adhesive sheet X1 and adherends having a metal adherend surface provided on both surfaces of the electrically debondable adhesive layer 1; an adhered body including the adhesive sheet X2, an adherend having a metal adherend surface provided on the electrically debondable adhesive layer 1 side, and an adherend provided on the adhesive layer 2 side; and an adhered body including the adhesive sheet X3 and adherends provided on both surfaces of the adhesive layer 2.

EXAMPLES

Hereinafter, the present invention will be specifically described with reference to Examples, but the present invention is not limited to these Examples. The weight average molecular weight described below is measured using a gel permeation chromatograph (GPC) method by the above-described method.

Examples 1-1 to 1-8 and Comparative Examples
1-1 to 1-5

<Preparation of Polymer Solution>
(Preparation of Acrylic Polymer 1 Solution)

Into a separable flask, 95 parts by mass of n-butyl acrylate (BA) and 5 parts by mass of acrylic acid (AA) as monomer components and 150 parts by mass of ethyl acetate as a polymerization solvent were charged and stirred for 1 hour with nitrogen gas introduced. In this manner, oxygen in the polymerization system was removed, and then 0.2 parts by mass of 2,2'-azobisisobutyronitrile (AIBN) as a polymerization initiator was added. The temperature was raised to 63° C. and a reaction was performed for 6 hours. Thereafter, ethyl acetate was added to obtain an acrylic polymer 1 solution having a solid content concentration of 40% by mass.

(Preparation of Acrylic Polymer 2 Solution)

Into a separable flask, 90 parts by mass of n-butyl acrylate (BA) and 10 parts by mass of 4-hydroxybutyl acrylate (4HBA) as monomer components and 150 parts by mass of ethyl acetate as a polymerization solvent were charged and stirred for 1 hour with nitrogen gas introduced. In this manner, oxygen in the polymerization system was removed, and then 0.2 parts by mass of 2,2'-azobisisobutyronitrile (AIBN) as a polymerization initiator was added. The temperature was raised to 63° C. and a reaction was performed for 6 hours. Thereafter, ethyl acetate was added to obtain an acrylic polymer 2 solution having a solid content concentration of 30% by mass.

(Preparation of Acrylic Polymer 3 Solution)

Into a separable flask, 67 parts by mass of n-butyl acrylate (BA), 30 parts by mass of 2-methoxyethyl acrylate (MEA) and 3 parts by mass of acrylic acid (AA) as monomer components and 150 parts by mass of ethyl acetate as a polymerization solvent were charged and stirred for 1 hour with nitrogen gas introduced. In this manner, oxygen in the polymerization system was removed, and then 0.2 parts by mass of 2,2'-azobisisobutyronitrile (AIBN) as a polymerization initiator was added. The temperature was raised to 63° C. and a reaction was performed for 6 hours. Thereafter, ethyl acetate was added to obtain an acrylic polymer 3 solution having a solid content concentration of 40% by mass.

(Preparation of Acrylic Polymer 4 Solution)

Into a separable flask, 67 parts by mass of n-butyl acrylate (BA) and 33 parts by mass of methyl methacrylate (MMA) as monomer components and 150 parts by mass of ethyl acetate as a polymerization solvent were charged and stirred for 1 hour with nitrogen gas introduced. In this manner, oxygen in the polymerization system was removed, and then 0.2 parts by mass of 2,2'-azobisisobutyronitrile (AIBN) as a polymerization initiator was added. The temperature was raised to 63° C. and a reaction was performed for 6 hours. Thereafter, ethyl acetate was added to obtain an acrylic polymer 4 solution having a solid content concentration of 40% by mass.

(Preparation of Acrylic Polymer 5 Solution)

Into a separable flask, 87 parts by mass of n-butyl acrylate (BA), 10 parts by mass of 4-hydroxybutyl acrylate (4HBA) and 3 parts by mass of acrylic acid (AA) as monomer components and 150 parts by mass of ethyl acetate as a polymerization solvent were charged and stirred for 1 hour with nitrogen gas introduced. In this manner, oxygen in the polymerization system was removed, and then 0.2 parts by mass of 2,2'-azobisisobutyronitrile (AIBN) as a polymerization initiator was added. The temperature was raised to 63° C. and a reaction was performed for 6 hours. Thereafter, ethyl acetate was added to obtain an acrylic polymer 5 solution having a solid content concentration of 30% by mass.

<Preparation of Adhesive Composition>

The acrylic polymer solution obtained above, and the polymer, the crosslinking agent, the ionic liquid, and the additive shown below were added, stirred and mixed to obtain adhesive compositions of Examples 1-1 to 1-8 and Comparative Examples 1-1 to 1-5. Table 1 shows the blending amount of each component.

The values of each component in Table 1 mean parts by mass. Further, the blending amount (parts by mass) of the polymer indicates the blending amount (parts by mass) of the solid content in the polymer solution.

The abbreviations for the polymers, the crosslinking agents, the ionic liquids, and the additives in Table 1 are as follows.

(Polymer)
  VYLON UR-V8700: urethane-modified polyester resin, trade name "VYLON UR-V8700", manufactured by Toyobo Co., Ltd.
  VYLON BX1001: polyester resin, trade name "VYLON BX1001", manufactured by Toyobo Co., Ltd.
  SOMAREX 530: anionic polyacrylamide polymer (ionic polymer), trade name "SOMAREX 530", manufactured by SOMAR Corporation (Ionic liquid)
  AS-110: cation: 1-ethyl-3-methylimidazolium cation, anion: bis(fluorosulfonyl)imide anion, trade name "ELEXCEL AS-110", manufactured by DKS Co. Ltd.

(Crosslinking Agent)
  V-05: polycarbodiimide resin, trade name "CARBODILITE V-05", manufactured by Nisshinbo Chemical Inc.
  TAKENATE D110: trimethylolpropanexylylene diisocyanate, trade name "TAKENATE D110N", manufactured by Mitsui Chemicals, Inc.

(Additive)
  EMI-nitrate: 1-ethyl-3-methylimidazolium nitrate, manufactured by Tokyo Chemical Industry Co., Ltd.
  Zn-nitrate: zinc nitrate hexahydrate, manufactured by Wako Pure Chemical Industries, Ltd.
  BTC-5B: barium titanate
  No. 27776: carbon black <Measurement of Relative Permittivity of Ionic Liquid-Free Adhesive Layer>

Materials, obtained in the same manner as in Examples 1-1 to 1-8 and Comparative Examples 1-1 to 1-5 except that an ionic liquid was not added, were stirred and mixed to obtain an ionic liquid-free adhesive composition. The ionic liquid-free adhesive composition was coated, using an applicator, onto a release-treated surface of a polyethylene terephthalate separator ("MRF38" (trade name) manufactured by Mitsubishi Plastics, Inc.) whose surface was subjected to a release treatment to have a uniform thickness. Next, the resulting coating film was dried by heating at 130° C. for 3 minutes to obtain an ionic liquid-free adhesive layer having a thickness of 30 μm. Next, the obtained ionic liquid-free adhesive layer was left to stand in an environment of 22° C. and 20% RH for 3 days, and then the relative permittivity of the adhesive layer at a frequency of 100 kHz was measured under the following conditions according to JIS K 6911.

(Measurement Conditions)
  Measurement method: capacitance method (device: 4294A Precision Impedance Analyzer, Agilent Technologies)
  Electrode configuration: aluminum plate having a diameter of 12.1 mmφ and a thickness of 0.5 mm
  Counter electrode: 3 oz copper plate
  Measurement environment: 23±1° C., 52±1% RH <Measurement of Water Content of Electrically Debondable Adhesive Layer>

The electrically debondable adhesive layer obtained using the adhesive composition of each example in the same manner as above was left to stand in an environment of 22° C. and 20% RH for 3 days, and then the water content of the adhesive layer was measured by the Karl Fischer water vaporization-coulometric titration method (JIS K 0113: 2005). Specifically, using the Hiranuma trace moisture measuring device AQ-2100 manufactured by HIRANUMA SANGYO Co., Ltd., the amount of water generated by heating vaporization at 200° C. for 30 minutes was measured, and the proportion to the sample weight before heating was used as the water content. That is, the water content was obtained according to the following equation. "-" in Table 1 means unmeasured.

Water content (%)=(Karl Fischer measured water amount/total sample weight before measurement)×100

<Evaluation>
(Initial Adhesive Force)

The adhesive composition of each example was coated, using an applicator, onto a release-treated surface of a polyethylene terephthalate separator ("MRF38" (trade name) manufactured by Mitsubishi Plastics, Inc.) whose surface was subjected to a release treatment to have a uniform thickness. Next, the resulting coating film was dried by heating at 130° C. for 3 minutes to obtain an electrically debondable adhesive layer (adhesive sheet) having a thickness of 30 m.

Figure 4:
FIG. 4 is a sectional view illustrating an overview of a method of a 1800 peel test in Examples.

Next, the obtained electrically debondable adhesive layer (adhesive sheet) was made into a sheet having a size of 10 mm×80 mm, and a metal layer surface of a metal layer-attached film (trade name "BR1075", manufactured by Toray Film Co., Ltd., thickness: 25 μm, size: 10 mm×100 mm) was adhered to a separator-free surface of the adhesive sheet, to obtain a substrate-attached single-sided adhesive sheet. A separator of the substrate-attached single-sided adhesive sheet was peeled off, and an aluminum plate (A5052P H32 (JIS H4000: 2014)) as an adherend was adhered to the peeled face such that one end of the adhesive sheet was protruded from the adherend by approximately 2 mm, pressed by reciprocating a 2 kg roller one time, followed by allowing it to stand in an environment of 23° C. for 30 minutes, and thus an adhered body including stainless steel plate 6/electrically debondable adhesive layer (adhesive sheet) 1'/metal layer-attached film (conduction substrate) 5' was obtained. The outline of the adhered body is shown in FIG. 4. Thereafter, the adhesive sheet was peeled in the arrow direction in FIG. 4 by a peel tester (trade name "variable angle peeling tester YSP", manufactured by Asahi Seiko Co., Ltd.), and the adhesive force in the 180° peel test (tensile rate: 300 mm/min, peeling temperature: 23° C.) was measured. The measurement results are shown in Table 1. %

(Adhesive Force During Voltage Application)

The adhesive force during voltage application was measured in the same manner as the above initial adhesive force measurement, except that, after pressing by reciprocating a 2 kg roller one time, the obtained adhesive sheet was left to stand in an environment of 22° C. and 20% RH for 3 days and that, before the peeling, negative and positive electrodes of a DC current machine were attached to a and R points of the adhered body in FIG. 4, a voltage of 10 V was applied for 30 seconds, and the peeling was performed with the voltage applied. The measurement results are shown in Table 1.

(Rate of Decrease in Adhesive Force)

Using the initial adhesive force and the adhesive force during voltage application measured by the above methods, the rate of decrease in adhesive force by voltage application was obtained by the following equation (C). The results are shown in Table 1.

Rate of decrease in adhesive force (%)={1−(adhesive force during voltage application/initial adhesive force)}×100     (C)

TABLE 1

| | | | Example 1-1 | Example 1-2 | Example 1-3 | Comparative Example 1-1 | Comparative Example 1-2 | Comparative Example 1-3 | Example 1-4 |
|---|---|---|---|---|---|---|---|---|---|
| Component | Polymer | Acrylic polymer 1 | 100 | 100 | 100 | 100 | 100 | 100 | |
| | | Acrylic polymer 2 | | | | | | | |
| | | Acrylic polymer 3 | | | | | | | |
| | | Acrylic polymer 4 | | | | | | | |
| | | Acrylic polymer 5 | | | | | | | |
| | | VYLON UR-V8700 | | | | | | | 100 |
| | | VYLON BX1001 | | | | | | | |
| | | SOMAREX 530 | | | 0.2 | | | | |
| | Ionic liquid | AS-110 | 5 | 5 | 5 | 5 | 5 | 5 | 5 |
| | Cross-linking agent | V-05 | 1 | 1 | 1 | 1 | 1 | 1 | |
| | | TAKENATE D110 | | | | | | | |
| | Additive | EMI-nitrate | 2 | | | | | | |
| | | Zn-nitrate | | 2 | | | | | |
| | | BTC-5B | | | | 2 | | | |
| | | No. 27776 | | | | | | 2 | |
| Physical property | | Relative permittivity (ε') of ionic liquid-free adhesive layer | 5.6 | 5.4 | 5.5 | 4.3 | 4.6 | 4.7 | 6.5 |
| | | Water content (%) | 0.22 | 0.27 | 0.4 | — | — | 0.15 | 0.35 |
| Evaluation | | Initial adhesive force (N/cm) | 5.55 | 4.92 | 6.01 | 4.65 | 4.63 | 5.12 | 2.59 |
| | | Adhesive force during voltage | 0.32 | 0.06 | 0.13 | 2.31 | 1.98 | 2.87 | 0.08 |

TABLE 1-continued

| | | | Example 1-5 | Example 1-6 | Example 1-7 | Example 1-8 | Comparative Example 1-4 | Comparative Example 1-5 |
|---|---|---|---|---|---|---|---|---|
| | | application (N/cm) | | | | | | |
| | | Rate of decrease in adhesive force (%) | 94.2 | 98.9 | 97.8 | 50.4 | 57.6 | 43.9 | 96.9 |

| | | | Example 1-5 | Example 1-6 | Example 1-7 | Example 1-8 | Comparative Example 1-4 | Comparative Example 1-5 |
|---|---|---|---|---|---|---|---|---|
| Component | Polymer | Acrylic polymer 1 | | | | | | 100 |
| | | Acrylic polymer 2 | | 100 | | | | |
| | | Acrylic polymer 3 | | | 100 | | | |
| | | Acrylic polymer 4 | | | | | 100 | |
| | | Acrylic polymer 5 | | | | 100 | | |
| | | VYLON UR-V8700 | | | | | | |
| | | VYLON BX1001 | 100 | | | | | |
| | | SOMAREX 530 | | | | | | |
| | Ionic liquid | AS-110 | 5 | 5 | 5 | 5 | 5 | 5 |
| | Cross-linking agent | V-05 | | | | 1 | 0.3 | |
| | | TAKENATE D110 | | | 0.5 | | 0.5 | |
| | Additive | EMI-nitrate | | | | | | |
| | | Zn-nitrate | | | | | 2 | |
| | | BTC-5B | | | | | | |
| | | No. 27776 | | | | | | |
| Physical property | | Relative permittivity (ε') of ionic liquid-free adhesive layer | 5.8 | 5.1 | 5.2 | 6.4 | 3.9 | 4.3 |
| | | Water content (%) | 0.32 | 0.13 | 0.23 | — | 0.11 | 4.3 |
| Evaluation | | Initial adhesive force (N/cm) | 3.45 | 3.02 | 3.72 | 5.06 | 5 | 0.24 |
| | | Adhesive force during voltage application (N/cm) | 0.05 | 0.49 | 0.79 | 0.65 | 2.32 | 2.57 |
| | | Rate of decrease in adhesive force (%) | 98.6 | 83.8 | 78.8 | 87.2 | 53.6 | 50.6 |

The adhesive compositions of Examples 1-1 to 1-8, in which the adhesive layer is formed of the composition composed of components other than the ionic liquid among components contained in the adhesive composition and the adhesive layer has a relative permittivity of 5 or more at a frequency of 100 Hz after being left to stand in an environment of 22° C. and 20% RH for 3 days, all have a large rate of decrease in adhesive force by voltage application.

Examples 2-1 to 2-11 and Comparative Examples 2-1 to 2-3

<Preparation of Polymer Solution>
(Preparation of Acrylic Polymer 6 Solution)

Into a separable flask, 90 parts by mass of n-butyl acrylate (BA) and 10 parts by mass of acrylic acid (AA) as monomer components and 150 parts by mass of ethyl acetate as a polymerization solvent were charged and stirred for 1 hour with nitrogen gas introduced. In this manner, oxygen in the polymerization system was removed, and then 0.2 parts by mass of 2,2'-azobisisobutyronitrile (AIBN) as a polymerization initiator was added. The temperature was raised to 63° C. and a reaction was performed for 6 hours. Thereafter, ethyl acetate was added to obtain an acrylic polymer 6 solution having a solid content concentration of 40% by mass.

(Preparation of Acrylic Polymer 7 Solution)

Into a separable flask, 90 parts by mass of n-butyl acrylate (BA), 7 parts by mass of 4-hydroxybutyl acrylate (4HBA) and 3 parts by mass of acrylic acid (AA) as monomer components and 150 parts by mass of ethyl acetate as a polymerization solvent were charged and stirred for 1 hour with nitrogen gas introduced. In this manner, oxygen in the polymerization system was removed, and then 0.2 parts by mass of 2,2'-azobisisobutyronitrile (AIBN) as a polymerization initiator was added. The temperature was raised to 63° C. and a reaction was performed for 6 hours. Thereafter, ethyl acetate was added to obtain an acrylic polymer 7 solution having a solid content concentration of 30% by mass.

(Preparation of Acrylic Polymer 8 Solution)

Into a separable flask, 94 parts by mass of n-butyl acrylate (BA), 3 parts by mass of 4-hydroxybutyl acrylate (4HBA) and 3 parts by mass of acrylic acid (AA) as monomer components and 150 parts by mass of ethyl acetate as a polymerization solvent were charged and stirred for 1 hour with nitrogen gas introduced. In this manner, oxygen in the polymerization system was removed, and then 0.2 parts by mass of 2,2'-azobisisobutyronitrile (AIBN) as a polymerization initiator was added. The temperature was raised to 63° C. and a reaction was performed for 6 hours. Thereafter, ethyl acetate was added to obtain an acrylic polymer 8 solution having a solid content concentration of 30% by mass.

(Preparation of Acrylic Polymer 9 Solution)

Into a separable flask, 77 parts by mass of n-butyl acrylate (BA), 20 parts by mass of 2-methoxyethyl acrylate (MEA) and 3 parts by mass of acrylic acid (AA) as monomer components and 150 parts by mass of ethyl acetate as a polymerization solvent were charged and stirred for 1 hour with nitrogen gas introduced. In this manner, oxygen in the polymerization system was removed, and then 0.2 parts by mass of 2,2'-azobisisobutyronitrile (AIBN) as a polymerization initiator was added. The temperature was raised to 63° C. and a reaction was performed for 6 hours. Thereafter, ethyl acetate was added to obtain an acrylic polymer 9 solution having a solid content concentration of 40% by mass.

(Preparation of Acrylic Polymer 10 Solution)

Into a separable flask, 87 parts by mass of n-butyl acrylate (BA), 10 parts by mass of 2-methoxyethyl acrylate (MEA) and 3 parts by mass of acrylic acid (AA) as monomer components and 150 parts by mass of ethyl acetate as a polymerization solvent were charged and stirred for 1 hour with nitrogen gas introduced. In this manner, oxygen in the polymerization system was removed, and then 0.2 parts by mass of 2,2'-azobisisobutyronitrile (AIBN) as a polymerization initiator was added. The temperature was raised to 63° C. and a reaction was performed for 6 hours. Thereafter, ethyl acetate was added to obtain an acrylic polymer 10 solution having a solid content concentration of 40% by mass.

<Preparation of Adhesive Composition>

The acrylic polymer solution obtained above, and the above polymer, crosslinking agent, ionic liquid and additive, or the following ionic liquid, corrosion inhibitor were added, stirred and mixed to obtain adhesive compositions of Examples 2-1 to 2-11 and Comparative Examples 2-1 to 2-3. Table 2 shows the blending amount of each component.

(Ionic Liquid)
  1-hexyl-pyridinium-bis(trifluorosulfonyl)imide (Corrosion Inhibitor, Additive, Crosslinking Agent)
  Irgamet 30: N,N-bis(2-ethylhexyl)-1,2,4-triazole-1-yl-methaneamine, trade name "Irgamet30", manufactured by BASF
  Irgacor DSSG: disodium sebacate, trade name "Irgamet DSSG", manufactured by BASF
  AminO: imidazolines derivative, trade name "AminO", manufactured by BASF
  PEG400: polyethylene glycol, trade name "PEG400", manufactured by Tokyo Chemical Industry Co., Ltd.
  CORONATE L: Isocyanate compound, trade name "CORONATE L", manufactured by Tosoh Corporation <Measurement of Ionic Conductivity of Adhesive Layer and Capacitance Per Unit Area>

A measurement sample (composite sample) was prepared using the adhesive composition of each example as follows, and the capacitance of the adhesive interface and the ionic conductivity of the adhesive layer were obtained by the following methods. The results are shown in Table 2.

(Preparation of Measurement Sample (Composite Sample))

First, the adhesive composition was uniformly coated onto an aluminum-deposited surface side of an aluminum-deposited PET film 100 (trade name "Metalumy-TS" manufactured by TORAY ADVANCED FILM CO., LTD.). At this time, in order to bring the electrode into contact with the aluminum-deposited surface, a portion where the adhesive composition was not coated was provided. Next, an adhesive layer 200 was formed by heating and drying the aluminum-deposited PET film at 130° C. for 3 minutes to obtain an adhesive sheet sample.

Thereafter, the adhesive surface of the obtained adhesive sheet sample was adhered to an aluminum plate 300 (A5052P H32 (JIS H4000: 2014)) to obtain an adhered body sample 400 having a shape as shown in FIGS. 5 and 6. FIG. 5 is a side view and FIG. 6 is a top view.

(Measurement of Capacitance and Ionic Conductivity)

An LCR meter (for example, IM3533 manufactured by HIOKI E.E.CORPORATION) was used for measuring the capacitance and the ionic conductivity.

First, an AC voltage of 0.5 V was applied between the aluminum plate 300 and the aluminum-deposited surface of the aluminum-deposited PET film 100 using an LCR meter, and the frequency was changed from 0.5 Hz to 200 kHz to obtain a cole-cole plot.

Next, the bulk of the adhesive layer 200 was regarded as a parallel circuit of a resistance component $R_{adh}$ and a capacitance component $C_{adh}$, the interface of the adhesive layer 200 was regarded as a parallel circuit of a resistance component $R_p$ and a capacitance component $C_{dl}$, an equivalent circuit of the adhered body sample was set as shown in FIG. 7, and the obtained cole-cole plot was fitted by the following equation (A). A resistance component $R_0$ is a wiring resistance.

[Eq. 3]

$$Z = R_0 + \frac{R_p}{\left(\cos\frac{\pi}{2}\alpha_1 + i\cdot\sin\frac{\pi}{2}\alpha_1\right)\cdot\omega^{\alpha_1}\cdot C_{dl} + 1} + \frac{R_{adh}}{\left(\cos\frac{\pi}{2}\alpha_2 + i\cdot\sin\frac{\pi}{2}\alpha_2\right)\cdot\omega^{\alpha_2}\cdot C_{adh} + 1} \quad (A)$$

In the equation (A), ω represents an angular frequency.

By dividing the obtained $C_{dl}$ by an area A of the adhesive surface of the adhesive layer 200, the capacitance per unit area of the interface between the adhesive layer 200 and the aluminum plate 300 was obtained.

Next, the ionic conductivity σ of the adhesive layer was obtained according to the following equation (B) using a resistance component $R_{adh}$ of the bulk of the adhesive layer 200 obtained from the equation (A).

[Eq. 4]

$$R_{adh} = \frac{1}{\sigma}\cdot\frac{l}{A} \quad (B)$$

In the equation (B), 1 represents the thickness of the adhesive layer, and A represents the area of the adhesive surface of the adhesive layer 200.

<Evaluation>

(Initial Adhesive Force)

For the adhesive composition of each example, the initial adhesive force was measured in the same manner as in Examples 1-1 to 1-8 and Comparative Examples 1-1 to 1-5, except that an aluminum-deposited PET film (trade name "Metalumy-TS" manufactured by TORAY ADVANCED FILM CO., LTD.) was used as a substrate and an adhesive layer was formed on the aluminum-deposited surface. The measurement results are shown in Table 2.

(Adhesive Force During Voltage Application after Storage in Environment of 22° C. and 20% RH for 3 Days)

The adhesive force during voltage application was measured in the same manner as the above initial adhesive force measurement, except that, after pressing by reciprocating a 2 kg roller one time, the obtained adhesive sheet was left to stand in an environment of 22° C. and 20% RH for 3 days and that, before the peeling, negative and positive electrodes of a DC current machine were attached to a and R points of the adhered body in FIG. 4, a voltage of 10 V was applied for 30 seconds, and the peeling was performed with the voltage applied. The electrical debondability was evaluated according to the following criteria. The measurement results are shown in Table 2.

○: the rate of decrease in adhesive force is 60% or more.
  x: the rate of decrease in adhesive force is less than 60%.

(Adhesive Force During Voltage Application after Storage in Environment of 22° C. and 15% RH for 7 Days)

The adhesive force during voltage application was measured in the same manner as the above initial adhesive force measurement, except that, after pressing by reciprocating a 2 kg roller one time, the obtained adhesive sheet was left to stand in an environment of 22° C. and 15% RH for 7 days and that, before the peeling, negative and positive electrodes of a DC current machine were attached to a and R points of the adhered body in FIG. 4, a voltage of 10 V was applied for 10 seconds, and the peeling was performed with the voltage applied. The measurement results are shown in Table 2.

(Rate of Decrease in Adhesive Force)

Using the initial adhesive force and the adhesive force during voltage application after storage in an environment of 22° C. and 15% RH for 7 days measured by the above methods, the rate of decrease in adhesive force by voltage application was obtained by the following equation (C). The results are shown in Table 2.

Rate of decrease in adhesive force (%)={1−(adhesive force during voltage application/initial adhesive force)}×100     (C)

TABLE 2

| | | | Example 2-1 | Example 2-2 | Example 2-3 | Example 2-4 | Example 2-5 | Comparative Example 2-1 | Comparative Example 2-2 |
|---|---|---|---|---|---|---|---|---|---|
| Component | Polymer | Acrylic polymer 1 | 100 | | | | | | |
| | | Acrylic polymer 2 | | | | | | | |
| | | Acrylic polymer 3 | | | 100 | | | | |
| | | Acrylic polymer 5 | | 100 | | | | | |
| | | Acrylic polymer 6 | | | | | | 100 | 100 |
| | | Acrylic polymer 7 | | | | | | | |
| | | Acrylic polymer 8 | | | | | | | |
| | | Acrylic polymer 9 | | | | | | | |
| | | Acrylic polymer 10 | | | | | | | |
| | | VYLON UR-V8700 | | | | 100 | | | |
| | | VYLON BX1001 | | | | | 100 | | |
| | | SOMAREX 530 | | | | | | | |
| | Ionic liquid | AS-110 | 5 | 5 | 5 | 5 | 5 | | |
| | | 1-hexyl-pyridinium-bis(trifluorosulfonyl)imide | | | | | | 10 | 10 |
| | Corrosion inhibitor | Irgacor DSSG | | | | | | | |
| | | AminO | | | | | | | |
| | Additive | PEG400 | | | | | | 20 | |
| | | Zn-nitrate | 2 | 2 | | | | | |
| | | EMI-nitrate | | | | | | | |
| | Crosslinking agent | V-05 | 1 | 0.3 | 1 | | | 0.5 | 0.5 |
| | | CORONATE L | | | | | | | |
| | | TAKENATE D110 | | | 0.5 | | | | |
| Physical property and evaluation | Initial adhesive force (N/cm) | | 6.75 | 5.33 | 4.32 | 6.12 | 5.78 | 2.92 | 6.77 |
| | After storage under 22° C. and 20% RH for 3 days | Electrical debondability | ◯ | ◯ | ◯ | ◯ | ◯ | ◯ | x |
| | After storage under 22° C. and 15% RH for 7 days | Capacitance (μF/cm²) | 1.41 | 0.95 | 1.04 | 0.94 | 0.92 | 0.81 | 0.62 |
| | | Ionic conductivity (μS/m) | 10.2 | 22.5 | 16.1 | 23.5 | 258.7 | 258.7 | 15.4 |
| | | Adhesive force during voltage application (N/cm) | 0.23 | 0.67 | 0.36 | 0.11 | 0.12 | 7.93 | 4.90 |
| | | Rate of decrease in adhesive force (%) | 96.6 | 87.4 | 91.7 | 98.2 | 97.9 | −171.3 | 27.6 |

| | | | Comparative Example 2-3 | Example 2-6 | Example 2-7 | Example 2-8 | Example 2-9 | Example 2-10 | Example 2-11 |
|---|---|---|---|---|---|---|---|---|---|
| Component | Polymer | Acrylic polymer 1 | 100 | 100 | | | | | |
| | | Acrylic polymer 2 | | | | | | | |
| | | Acrylic polymer 3 | | | | | | 100 | |
| | | Acrylic polymer 5 | | | | | | | |
| | | Acrylic polymer 6 | | | | | | | |
| | | Acrylic polymer 7 | | | 100 | | | | |
| | | Acrylic polymer 8 | | | | 100 | | | |
| | | Acrylic polymer 9 | | | | | 100 | | |
| | | Acrylic polymer 10 | | | | | | | 100 |
| | | VYLON UR-V8700 | | | | | | | |
| | | VYLON BX1001 | | | | | | | |
| | | SOMAREX 530 | | 0.2 | 0.2 | 0.2 | 0.2 | 0.2 | 0.2 |
| | Ionic liquid | AS-110 | 5 | 5 | 5 | 5 | 5 | 5 | 5 |
| | | 1-hexyl-pyridinium-bis(trifluorosulfonyl)imide | 0.8 | 0.8 | 0.8 | 0.8 | 0.8 | 0.8 | 0.8 |

TABLE 2-continued

|  |  |  |  |  |  |  |  |  |  |
|---|---|---|---|---|---|---|---|---|---|
|  | Corrosion inhibitor Additive | Irgacor DSSG | 0.3 | 0.3 | 0.3 | 0.3 | 0.3 | 0.3 | 0.3 |
|  |  | AminO |  | 3 | 3 | 3 | 3 | 3 | 3 |
|  |  | PEG400 |  |  |  |  |  |  |  |
|  |  | Zn-nitrate |  |  |  |  |  |  |  |
|  |  | EMI-nitrate |  | 2 | 2 | 2 | 2 | 2 | 2 |
|  | Crosslinking agent | V-05 | 0.75 | 0.8 | 0.2 | 0.5 | 0.5 | 0.5 | 0.5 |
|  |  | CORONATE L | 0.25 | 0.25 | 0.1 |  |  |  |  |
|  |  | TAKENATE D110 |  |  |  |  |  |  |  |
| Physical property and evaluation | Initial adhesive force (N/cm) |  | 5.76 | 5.29 | 4.47 | 2.84 | 2.74 | 2.77 | 3.12 |
|  | After storage under 22° C. and 20% RH for 3 days | Electrical debondability | x | ○ | ○ | ○ | ○ | ○ | ○ |
|  | After storage under 22° C. and 15% RH for 7 days | Capacitance (μF/cm$^2$) | 0.89 | 1.30 | 1.37 | 1.37 | 1.30 | 1.31 | 1.3 |
|  |  | Ionic conductivity (μS/m) | 8.5 | 10.7 | 44.9 | 21.9 | 47.1 | 32.5 | 22.6 |
|  |  | Adhesive force during voltage application (N/cm) | 3.41 | 0.94 | 0.11 | 0.09 | 0.14 | 0.10 | 0.12 |
|  |  | Rate of decrease in adhesive force (%) | 40.8 | 82.2 | 97.5 | 96.8 | 94.9 | 96.4 | 96.1 |

The adhesive compositions of Examples 2-1 to 2-11, in which the adhesive layer is formed of the adhesive composition, and, after being adhered to the aluminum plate made of A5052P H32 in JIS H4000:2014 and left to stand in an environment of 22° C. and 15% RH for 7 days, the adhesive layer has a capacitance per unit area of an interface between the adhesive layer and the aluminum plate of 0.9 μF/cm$^2$ or more and an ionic conductivity of 10 μS/m or more, all have a large rate of decrease in adhesive force by voltage application.

Examples 3-1 to 3-5

<Preparation of Polymer Solution>
(Preparation of Acrylic Polymer 11 Solution)

Into a separable flask, 95 parts by mass of 2-methoxyethyl acrylate (MEA) and 5 parts by mass of 4-hydroxybutyl acrylate (4HBA) as monomer components were charged and stirred for 1 hour with nitrogen gas introduced. In this manner, oxygen in the polymerization system was removed, and then 0.2 parts by mass of 2,2'-azobisisobutyronitrile (AIBN) as a polymerization initiator was added. The temperature was raised to 63° C. and a reaction was performed for 6 hours. Thereafter, ethyl acetate was added to obtain an acrylic polymer 11 solution having a solid content concentration of 30% by mass.

<Preparation of Adhesive Composition>

The acrylic polymer solution obtained above, and the above polymer, crosslinking agent, ionic liquid and additive, or the following additive were added, stirred and mixed to obtain adhesive compositions of Examples 3-1 to 3-5. Table 3 shows the blending amount of each component.
(Additive)
  EMIM-MeSO$_3$: ionic additive, imidazolium salt, manufactured by Tokyo Chemical Industry Co., Ltd.
  EPOMIN 200: polyethyleneimine, manufactured by NIPPON SHOKUBAI CO., LTD.

<Measurement and Evaluation of Ionic Conductivity of Adhesive Layer and Capacitance Per Unit Area>

In the same manner as in Examples 2-1 to 2-11 and Comparative Examples 2-1 to 2-3, the initial adhesive force, the adhesive force during voltage application and the rate of decrease in adhesive force after storage in an environment of 22° C. and 20% RH for 3 days, and the adhesive force during voltage application and the rate of decrease in adhesive force after storage in an environment of 22° C. and 15% RH for 7 days were measured. In addition, in the same manner as in Examples 2-1 to 2-11 and Comparative Examples 2-1 to 2-3, a measurement sample (composite sample) was prepared, and the capacitance of the adhesive interface and the ionic conductivity of the adhesive layer were obtained. The results are shown in Table 3.

TABLE 3

|  |  |  | Example 3-1 | Example 3-2 | Example 3-3 | Example 3-4 | Example 3-5 |
|---|---|---|---|---|---|---|---|
| Component | Polymer | Acrylic polymer 10 |  |  | 100 |  |  |
|  |  | Acrylic polymer 11 |  |  |  | 100 | 100 |
|  |  | VYLON UR-V8700 | 100 |  |  |  |  |
|  |  | VYLON BX1001 |  | 100 |  |  |  |
|  | Ionic liquid | AS-110 | 5 | 5 | 5 | 5 | 5 |
|  | Corrosion inhibitor | Irgamet 30 | 0.8 | 0.8 | 0.8 |  |  |
|  |  | Irgacor DSSG | 0.3 | 0.3 | 0.3 |  |  |
|  |  | AminO | 3 | 3 | 3 |  |  |
|  | Additive | EMI-nitrate | 2 | 2 |  |  |  |
|  |  | SOMAREX 530 | 0.2 | 0.2 | 0.2 |  |  |
|  |  | EMIM—MeSO$_3$ |  |  | 2 |  |  |
|  |  | EPOMIN 200 |  |  |  |  | 10 |
|  | Crosslinking agent | V-05 |  |  |  | 0.3 |  |
|  |  | TAKENATE D110 |  |  |  | 0.15 |  |
| Physical property and evaluation | Initial adhesive force (N/cm) |  | 6.22 | 6.25 | 6.22 | 2.83 | 1.93 |
|  | After storage under 22° C. and 20% RH for 3 | Adhesive force during voltage application (N/cm) | 0.03 | 0.04 | 0.03 | 0.03 | 0.03 |

TABLE 3-continued

|  |  | Example 3-1 | Example 3-2 | Example 3-3 | Example 3-4 | Example 3-5 |
|---|---|---|---|---|---|---|
| days | Rate of decrease in adhesive force (%) | 99.5 | 99.4 | 99.5 | 98.9 | 98.4 |
| After storage under 22° C. and 15% RH for 7 days | Capacitance ($\mu F/cm^2$) | 1.62 | 1.24 | 1.20 | 0.99 | 1.7 |
|  | Ionic conductivity ($\mu S/m$) | 80.0 | 25.0 | 20.0 | 144.0 | 196 |
|  | Adhesive force during voltage application (N/cm) | 0.07 | 0.05 | 0.09 | 0.13 | 0.01 |
|  | Rate of decrease in adhesive force (%) | 98.9 | 99.2 | 98.6 | 95.4 | 99.5 |

The adhesive compositions of Examples 3-1 to 3-5, in which the adhesive layer is formed of the adhesive composition, and, after being adhered to the aluminum plate made of A5052P H32 in JIS H4000:2014 and left to stand in an environment of 22° C. and 15% RH for 7 days, the adhesive layer has a capacitance per unit area of an interface between the adhesive layer and the aluminum plate of 0.9 $\mu F/cm^2$ or more and an ionic conductivity of 10 $\mu S/in$ or more, all have a large rate of decrease in adhesive force by voltage application.

Although the preferred embodiments of the present invention have been described above, the present invention is not limited to the above-described embodiment, and various modifications and substitutions can be added to the above-described embodiment without departing from the scope of the present invention.

REFERENCE SIGNS LIST

X1, X2, X3 adhesive sheet
1 electrically debondable adhesive layer
2 adhesive layer
3 substrate
4 conductive layer
5 conduction substrate
100 aluminum-deposited PET film
200 adhesive layer
300 aluminum plate
400 adhered body sample

The invention claimed is:

1. An adhesive composition comprising:
a polymer;
a cross-linking agent;
an additive; and
an ionic liquid, wherein
when an ionic liquid-free adhesive layer is formed of a composition composed of components other than the ionic liquid among components contained in the adhesive composition, the ionic liquid-free adhesive layer has a relative permittivity of 5 or more at a frequency of 100 Hz after being left to stand in an environment of 22° C. and 20% RH for 3 days.

2. The adhesive composition according to claim 1, wherein
the additive comprises an ionic solid.

3. The adhesive composition according to claim 1, wherein
the polymer includes an ionic polymer.

4. The adhesive composition according to claim 1, wherein
the polymer includes at least one selected from the group consisting of a polyester-based polymer, a urethane-based polymer, and an acrylic polymer having a carboxyl group, an alkoxy group, a hydroxy group and/or an amide bond.

5. The adhesive composition according to claim 1, which is for use in electrical debonding.

6. The adhesive composition according to claim 1,
wherein the polymer is an acrylic polymer having an alkoxy group, and the acrylic polymer has a monomer unit derived from an alkyl (meth)acrylate of the following Formula (1),

$$CH_2=C(R^a)COOR^b \quad (1)$$

where $R^a$ is a hydrogen atom or a methyl group, and $R^b$ is an alkyl group having 1 to 8 carbon atoms.

7. An adhesive composition comprising:
a polymer;
a cross-linking agent;
an additive; and
an ionic liquid, wherein
when an adhesive layer is formed of the adhesive composition, and after the adhesive layer formed of the adhesive composition is adhered to an aluminum plate made of A5052P H32 in JIS H4000:2014 and left to stand in an environment of 22° C. and 15% RH for 7 days, the adhesive layer has a capacitance per unit area of an interface between the adhesive layer and the aluminum plate of 0.9 $\mu F/cm^2$ or more, and has an ionic conductivity of 10 $\mu S/m$ or more, and
when an ionic liquid-free adhesive layer is formed of a composition composed of components other than the ionic liquid among components contained in the adhesive composition, the ionic liquid-free adhesive layer has a relative permittivity of 5 or more at a frequency of 100 Hz after being left to stand in an environment of 22° C. and 20% RH for 3 days.

8. The adhesive composition according to claim 7, wherein
when the adhesive layer is formed of the adhesive composition, the adhesive layer has a capacitance per unit area of the interface between the adhesive layer and the aluminum plate of 1.2 $\mu F/cm^2$ or more, and an ionic conductivity of 20 $\mu S/m$ or more after being adhered to the aluminum plate made of A5052P H32 in JIS H4000:2014 and left to stand in the environment of 22° C. and 15% RH for 7 days.

9. The adhesive composition according to claim 7, wherein
the additive comprises an ionic solid.

10. The adhesive composition according to claim 7, wherein
the polymer includes an ionic polymer.

11. The adhesive composition according to claim 7, wherein
the polymer includes at least one selected from the group consisting of a polyester-based polymer, a urethane-based polymer, and an acrylic polymer having a carboxyl group, an alkoxy group, a hydroxy group and/or an amide bond.

12. The adhesive composition according to claim 7, wherein the polymer is an acrylic polymer having an alkoxy group, and the acrylic polymer has a monomer unit derived from an alkyl (meth)acrylate of the following Formula (1), $$CH_2=C(R^a)COOR^b \quad (1)$$

where $R^a$ is a hydrogen atom or a methyl group, and $R^b$ is an alkyl group having 1 to 8 carbon atoms.

13. An adhesive composition comprising:
a polymer;
a cross-linking agent;
an additive; and
an ionic liquid, wherein
the adhesive composition contains 0.5 to 30 parts by mass of the ionic liquid and 0.5 to 10 parts by mass of an ionic solid per 100 parts by mass of the polymer, and
when an ionic liquid-free adhesive layer is formed of a composition composed of components other than the ionic liquid among components contained in the adhesive composition, the ionic liquid-free adhesive layer has a relative permittivity of 5 or more at a frequency of 100 Hz after being left to stand in an environment of 22° C. and 20% RH for 3 days.

14. The adhesive composition according to claim 13, wherein the polymer is an acrylic polymer having an alkoxy group, and the acrylic polymer has a monomer unit derived from an alkyl (meth)acrylate of the following Formula (1), $$CH_2=C(R^a)COOR^b \quad (1)$$

where $R^a$ is a hydrogen atom or a methyl group, and $R^b$ is an alkyl group having 1 to 8 carbon atoms.

15. An adhesive composition comprising:
a polymer;
a cross-linking agent;
an additive; and
an ionic liquid, wherein
the adhesive composition contains 0.5 to 30 parts by mass of the ionic liquid per 100 parts by mass of the polymer, and the polymer contains 0.05 to 2 parts by mass of an ionic polymer, and
when an ionic liquid-free adhesive layer is formed of a composition composed of components other than the ionic liquid among components contained in the adhesive composition, the ionic liquid-free adhesive layer has a relative permittivity of 5 or more at a frequency of 100 Hz after being left to stand in an environment of 22° C. and 20% RH for 3 days.

16. The adhesive composition according to claim 15, wherein the polymer is an acrylic polymer having an alkoxy group, and the acrylic polymer has a monomer unit derived from an alkyl (meth)acrylate of the following Formula (1), $$CH_2=C(R^a)COOR^b \quad (1)$$

where $R^a$ is a hydrogen atom or a methyl group, and $R^b$ is an alkyl group having 1 to 8 carbon atoms.

17. An adhesive composition comprising:
100 parts by mass of an acrylic polymer;
a cross-linking agent;
an additive; and
0.5 to 30 parts by mass of an ionic liquid, wherein
a proportion of a polar group-containing monomer to total monomer components constituting the acrylic polymer is 0.1 to 35% by mass, and
when an ionic liquid-free adhesive layer is formed of a composition composed of components other than the ionic liquid among components contained in the adhesive composition, the ionic liquid-free adhesive layer has a relative permittivity of 5 or more at a frequency of 100 Hz after being left to stand in an environment of 22° C. and 20% RH for 3 days.

18. The adhesive composition according to claim 17, wherein the acrylic polymer has a monomer unit derived from a polar group-containing monomer,
the polar group-containing monomer is an alkoxy group-containing monomer, and
the acrylic polymer has a monomer unit derived from an alkyl (meth)acrylate of the following Formula (1), $$CH_2=C(R^a)COOR^b \quad (1)$$

where $R^a$ is a hydrogen atom or a methyl group, and $R^b$ is an alkyl group having 1 to 8 carbon atoms.

19. An adhesive sheet comprising:
an adhesive layer formed of the adhesive composition according to claim 1.

20. An adhered body comprising:
an adherend having a metal adherend surface; and
the adhesive sheet according to claim 19, wherein
the adhesive layer of the adhesive sheet is adhered to the metal adherend surface.

* * * * *